US007925513B2

(12) United States Patent
Chao et al.

(10) Patent No.: US 7,925,513 B2
(45) Date of Patent: Apr. 12, 2011

(54) FRAMEWORK FOR PROCESSING SALES TRANSACTION DATA

(75) Inventors: David Chao, Austin, TX (US); Brian Blount, Austin, TX (US); Joshua Toub, Austin, TX (US); Charles Erickson, Cedar Park, TX (US); Cheng Zhou, Austin, TX (US); Shari Gharavy, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 571 days.

(21) Appl. No.: 09/809,991

(22) Filed: Mar. 15, 2001

(65) Prior Publication Data

US 2002/0169678 A1 Nov. 14, 2002

(51) Int. Cl.
*G06Q 10/00* (2006.01)
(52) U.S. Cl. .................................. 705/1; 705/26; 705/4
(58) Field of Classification Search .................... 705/26, 705/27, 1, 4
See application file for complete search history.

(56) References Cited

U.S. PATENT DOCUMENTS

| | | | | |
|---|---|---|---|---|
| 4,825,360 A | | 4/1989 | Knight, Jr. ...................... 364/200 |
| 5,181,162 A | | 1/1993 | Smith et al. .................... 715/530 |
| 5,337,263 A | | 8/1994 | Patermaster | |
| 5,369,732 A | | 11/1994 | Lynch et al. | |
| 5,446,653 A | | 8/1995 | Miller et al. | |
| 5,483,444 A | | 1/1996 | Heintzeman et al. ......... 364/401 |
| 5,515,524 A | | 5/1996 | Lynch et al. | |
| 5,692,206 A | * | 11/1997 | Shirley et al. ................. 715/256 |
| 5,708,798 A | | 1/1998 | Lynch et al. | |
| 5,790,677 A | | 8/1998 | Fox et al. ......................... 705/78 |
| 5,825,651 A | * | 10/1998 | Gupta et al. .................. 700/103 |
| 5,832,268 A | | 11/1998 | Anderson et al. | |
| 5,864,620 A | | 1/1999 | Pettitt ............................. 705/54 |
| 5,878,400 A | | 3/1999 | Carter, III | |
| 6,002,854 A | | 12/1999 | Lynch et al. | |
| 6,055,637 A | | 4/2000 | Hudson et al. .................. 726/20 |

(Continued)

FOREIGN PATENT DOCUMENTS

EP 0817017 A2 1/1998

OTHER PUBLICATIONS

Contractmaker, http:/web.archive.org/web/20010204115100/http://www.digicontracts.com/, dated Feb. 4, 2001.*

(Continued)

*Primary Examiner* — Mark Fadok
(74) *Attorney, Agent, or Firm* — Hamilton & Terrile, LLP; Kent B. Chambers

(57) ABSTRACT

A framework that enables financial services companies to manage and track information about a sales force is provided. The framework includes object models for managing distributors information, for validating and tracking licenses and credentials, for creating customized contracts, and for maintaining compensation structures. The framework allows for configuring compensations, providing financial services companies a toolkit for creating and modeling their complex commission schedules used to compensate their sales force. The framework also provides modeling tools for agreements and contracts between a financial services company or provider and the distributors who sell their products. The framework has a multi-component architecture comprising multiple modules, multiple data processing engines, a backbone and multiple data sources. The processing modules carry out information processing using one or more data processing engines. The data processing provides the tools to fetch data from the databases and process it.

31 Claims, 8 Drawing Sheets

U.S. PATENT DOCUMENTS

| | | | | |
|---|---|---|---|---|
| 6,065,026 | A | 5/2000 | Cornelia et al. | 715/531 |
| 6,105,001 | A | 8/2000 | Masi et al. | 705/14 |
| 6,128,603 | A | 10/2000 | Dent et al. | |
| 6,134,533 | A * | 10/2000 | Shell | 705/26 |
| 6,157,922 | A | 12/2000 | Vaughan | |
| 6,182,095 | B1 | 1/2001 | Leymaster et al. | |
| 6,275,871 | B1 | 8/2001 | Reinfelder et al. | 709/328 |
| 6,351,738 | B1 | 2/2002 | Clark | |
| 6,351,812 | B1 | 2/2002 | Datar et al. | 713/182 |
| 6,377,956 | B1 | 4/2002 | Hsu et al. | 707/104.1 |
| 6,405,308 | B1 | 6/2002 | Gupta et al. | 713/1 |
| 6,415,265 | B1 * | 7/2002 | Shell et al. | 705/26 |
| 6,446,057 | B1 | 9/2002 | Vaughan | 706/46 |
| 6,470,318 | B1 | 10/2002 | Coakley | |
| 6,473,609 | B1 | 10/2002 | Schwartz et al. | 455/406 |
| 6,477,533 | B2 | 11/2002 | Schiff et al. | 707/10 |
| 6,510,513 | B1 | 1/2003 | Danieli | 713/156 |
| 6,553,350 | B2 | 4/2003 | Carter | 705/20 |
| 6,594,633 | B1 | 7/2003 | Broerman | 705/1 |
| 6,606,744 | B1 * | 8/2003 | Mikurak | 705/26 |
| 6,618,706 | B1 | 9/2003 | Rive et al. | 705/30 |
| 6,629,153 | B1 | 9/2003 | Gupta et al. | 709/316 |
| 6,636,852 | B2 * | 10/2003 | Gozdeck et al. | 707/9 |
| 6,662,164 | B1 * | 12/2003 | Koppelman et al. | 705/14 |
| 6,671,818 | B1 | 12/2003 | Mikurak | 714/4 |
| 6,714,914 | B1 | 3/2004 | Peters et al. | 705/4 |
| 6,751,596 | B1 | 6/2004 | Hastings | 705/10 |
| 6,772,204 | B1 | 8/2004 | Hansen | 709/220 |
| 6,778,880 | B2 | 8/2004 | Okamura | 700/226 |
| 6,782,369 | B1 | 8/2004 | Carrott | 705/1 |
| 6,847,935 | B1 | 1/2005 | Solomon et al. | |
| 6,862,571 | B2 | 3/2005 | Martin et al. | 705/4 |
| 6,865,524 | B1 | 3/2005 | Shah et al. | 703/13 |
| 6,889,206 | B1 | 5/2005 | Nuttall | 705/52 |
| 6,938,021 | B2 | 8/2005 | Shear et al. | 706/67 |
| 6,986,038 | B1 | 1/2006 | Leah et al. | 713/155 |
| 6,999,946 | B2 | 2/2006 | Nuttall | 705/52 |
| 7,007,227 | B1 | 2/2006 | Constantino et al. | |
| 7,016,859 | B2 * | 3/2006 | Whitesage | 705/8 |
| 7,016,871 | B1 * | 3/2006 | Fisher et al. | 705/35 |
| 7,069,235 | B1 | 6/2006 | Postelnik et al. | 705/26 |
| 7,089,315 | B2 | 8/2006 | Nuttall | 709/229 |
| 7,124,101 | B1 | 10/2006 | Mikurak | |
| 7,133,845 | B1 | 11/2006 | Ginter et al. | 705/51 |
| 7,155,409 | B1 | 12/2006 | Stroh | |
| 7,200,749 | B2 | 4/2007 | Wheeler et al. | |
| 7,225,165 | B1 | 5/2007 | Kyojima et al. | |
| 7,272,572 | B1 * | 9/2007 | Pienkos | 705/26 |
| 7,359,871 | B1 | 4/2008 | Paasche et al. | |
| 7,373,324 | B1 | 5/2008 | Engin et al. | |
| 7,389,259 | B2 | 6/2008 | Duncan | |
| 7,475,025 | B2 | 1/2009 | Wiesehuegel et al. | |
| 2001/0032094 | A1 | 10/2001 | Ghosh et al. | 705/1 |
| 2001/0034682 | A1 | 10/2001 | Knight et al. | |
| 2001/0037265 | A1 * | 11/2001 | Kleinberg | 705/27 |
| 2001/0039547 | A1 | 11/2001 | Black et al. | 707/102 |
| 2001/0047299 | A1 | 11/2001 | Brewer et al. | |
| 2001/0049622 | A1 * | 12/2001 | Gozdeck et al. | 705/11 |
| 2001/0051917 | A1 | 12/2001 | Bissonette et al. | |
| 2002/0023055 | A1 | 2/2002 | Antognini et al. | |
| 2002/0023109 | A1 | 2/2002 | Lederer et al. | |
| 2002/0055850 | A1 * | 5/2002 | Powell et al. | 705/1 |
| 2002/0091614 | A1 * | 7/2002 | Yehia et al. | 705/37 |
| 2002/0120476 | A1 * | 8/2002 | Labelle et al. | 705/4 |
| 2002/0133383 | A1 | 9/2002 | Chao et al. | |
| 2002/0169678 | A1 * | 11/2002 | Chao et al. | 705/26 |
| 2002/0188535 | A1 | 12/2002 | Chao et al. | |
| 2003/0004840 | A1 | 1/2003 | Gharavy | |
| 2003/0018481 | A1 | 1/2003 | Zhou | |
| 2006/0206789 | A1 | 9/2006 | Bakman et al. | |

OTHER PUBLICATIONS

Contractmaker, http:/web.archive.org/web/20010303160139/www. digicontracts.com/kits/libdocmenu.html, dated Mar. 3, 2001.*

Mirriam Webster's Dictionary, definition of relationship, Tenth edition.*

SC Commission, http//:web.archive.org/web/19990428194803/ www.trilogy.com/products/sc_commission.asp, 2 pages dated Apr. 28, 1999.*

U.S. Appl. No. 08/780,600, Shah et al.
U.S. Appl. No. 08/931,878, Gupta.
U.S. Appl. No. 09/081,857, Koppelman et al.
U.S. Appl. No. 09/163,752, Waugh et al.
U.S. Appl. No. 09/165,656, Gupta.
U.S. Appl. No. 09/253,427, Carter, III.
U.S. Appl. No. 09/413,963, Lynch et al.
U.S. Appl. No. 09/730,481, Vaughan.
U.S. Appl. No. 09/810,012, Chao et al.
U.S. Appl. No. 09/810,514, Chao et al.
U.S. Appl. No. 09/810,515, Zhou et al.
U.S. Appl. No. 09/810,519, Zhou et al.
U.S. Appl. No. 09/896,140, Gharavy.
U.S. Appl. No. 09/896,144, Gharavy.

Norman Walsh, XSL The Extensible Style Language [online]. Web Techniques, Jan. 1999 [retrieved on Feb. 11, 2001]. Retrieved from the Internet: <URL: http://www.webtechniques.com/archives/1990/01/walsh/>.

Selena Sol, What is a Markup Language [online]. Web Developer's Virtual Library, Mar. 8, 1999 [retrieved on Apr. 17, 2001]. Retrieved from the Internet: <URL: http://wdvl.internet.com/Authoring/Languages/XML/Tutorials/Intro/what_is_markup_language>.

Selena Sol, What is XML [online]. Web Developer's Virtual Library, Mar. 8, 1999 [retrieved on Feb. 2, 2001]. Retrieved from the Internet: <URL: http://wdvl.internet.com/Authoring/Languages/XML/Tutorials/Intro/what_is_xml.html>.

Selena Sol, The Well-Formed Document [online]. Web Developer's Virtual Library, Mar. 29, 1999 [retrieved on Feb. 11, 2001]. Retrieved from the Internet: <URL: http://wdvl.internet.com/Authoring/Languages/XML/Tutorials/Intro/well_formed_doc.html>.

Selena Sol, Introducing the Valid XML Document and the DTD [online]. Web Developer's Virtual Library, May 3, 1999 [retrieved on Feb. 11, 2001]. Retrieved from the Internet: <URL: http://wdvl.internet.com/Authoring/Languages/XML/Tutorials/Intro/dtd_intro.html>.

XSLT, Xpath and XSL Formatting Objects [online]. Web Developer's Virtual Library [retrieved on Feb. 11, 2001]. Retrieved from the Internet: <URL: http://wdvl.internet.com/Authoring/Languages/XSL/>.

Adam Rifkin, A Look at XML [online], [retrieved on Nov. 2, 2001]. Retrieved from the Internet: <URL: http://www.webdeveloper.com/xml/xml_a_look_at_xml.html>.

A Flexible Commission System to Improve Your Agency Relationships, CSC: Financial Services—S3+ Contracts and Commissions [online], [retrieved on Aug. 15, 2001]. Retrieved from the Internet: <URL: http://www.csc-fs.com/MARKETS/detail/pc_s3contracts.asp>.

PolicyLink Commission System, CSC: Financial Services [online], [retrieved on Aug. 15, 2001]. Retrieved from the Internet: <URL: http://www.csc-fs.com/MARKETS/detail/la_policylinkcomm.asp>.

Pictorial, Inc.—Insurance and Financial Services Training [online], Dec. 2, 2000 [retrieved on Feb. 16, 2001]. Retrieved from the Internet: <URL: http://www.pictorial.com/>.

What is AppointPAK? [online], [retrieved on Aug. 16, 2001]. Retrieved from the Internet: <URL: http://www.bisys-licensing.com/apptpak/whatis.htm>.

AppointPAK Features & Benefits [online], [retrieved on Aug. 16, 2001]. Retrieved from the Internet: <URL: http://www.bisys-licensing.com/apptpak/features.htm#buried>.

What is e-PAL? [online], [retrieved on Aug. 16, 2001]. Retrieved from the Internet: <URL: http://www.bisys-licensing.com/palvt/whatis.html>.

e-PAL Features & Benefits [online], [retrieved on Aug. 16, 2001]. Retrieved from the Internet: <URL: http://www.bisys-licensing.com/palvt/features.htm#source>.

Nine e-PAL Services, Features and Benefits [online], [retrieved on Aug. 16, 2001]. Retrieved from the Internet: <URL: http://www.bisys-licensing.com/palvt/serv.html#adjust>.

HRMS Enterprise Applications, Human Resources Management, PeopleSoft, Inc. [online], [retrieved on Aug. 16, 2001]. Retrieved from the Internet: <URL: http://www.peoplesoft.com/en/us/products/applications/hrm/HRMS/hrmsea/index.html>.
HRMS Collaborative Applications, Human Resources Management, PeopleSoft, Inc. [online], [retrieved on Aug. 16, 2001]. Retrieved from the Internet: <URL: http://www.peoplesoft.com/en/us/products/applications/hrm/HRMS/hrmsca/index.html>.
Financial Planning Made Easy, American Express, Financial Services [online], [retrieved on Aug. 16, 2001]. Retrieved from the Internet: <URL: http://finance.americanexpress.com/sif/cda/page/0,1641,4588,00.asp>.
Advice and Planning, American Express, Financial Services [online], [retrieved on Aug. 16, 2001]. Retrieved from the Internet: <URL: http://finance.americanexpress.com/sif/cda/page/0,1641,7569,00.asp>.
Why ContractMaker, and How Does It Work?, Legal Contracts, Digital Contracts, Inc., [online], [retrieved on Aug. 8, 2001]. Retrieved from the Internet: <URL: http://www.digicontracts.com/info/whyhow.html>.
Frequently Asked Questions, Digital Contracts, Inc., [online], [retrieved on Aug. 16, 2001]. Retrieved from the Internet: <URL: http://www.digicontracts.com/kits/faqs.html>.
Norman Walsh, XSL The Extensible Style Language [online], Web Techniques, Jan. 1999 http://www.webtechniques.com/archives/1990/01/walsh/, retrieved Aug. 9, 2005.
Selena Sol, What is a Markup Language [online], Web Developer's Virtual Library, Mar. 8, 1999, http://www.wdvl.internet.com/Authoring/Languages/XML/Tutorials/Intro/what_is_markup_language, retrieved Sep. 21, 2005.
Selena Sol, What is XML [online], Web Developer's Virtual Library, Mar. 8, 1999, http://wdvl.internet.com/Authoring/Languages/XML/Tutorials/Intro/what_is_xml.html, retrieved Sep. 16, 2005.
Selena Sol, The Well-Formed Document [online], Web Developer's Virtual Library, Mar. 8, 1999, http://wdvl.internet.com/Authoring/Languages/XML/Tutorials/Intro/well_iformed_doc.html, retrieved Aug. 10, 2005.
U.S. Appl. No. 09/163,752, filed Sep. 30, 1998, Waugh et al.
U.S. Appl. No. 09/413,963, filed Oct. 7, 1999, Lynch et al.
U.S. Appl. No. 09/809,991, filed Mar. 15, 2001, Chao et al.
U.S. Appl. No. 09/810,012, filed Mar. 15, 2001, Chao et al.
U.S. Appl. No. 09/810,515, filed Mar. 15, 2001, Zhou et al.
U.S. Appl. No. 09/810,519, filed Mar. 13, 2001, Zhou et al.
U.S. Appl. No. 09/896,140, filed Jun. 29, 2001, Gharavy.
U.S. Appl. No. 09/896,144, filed Jun. 29, 2001, Gharavy.
Selena Sol, Introducing the Valid XML Document and the DTD [online], Web Developer's Virtual Library, May 3, 1999, http://wdvl.internet.com/Authoring/Languages/XML/Tutorials/Intro/dtd_intro.html, retrieved Aug. 10, 2005.
XSLT, Xpath and XSL Formatting Objects [online], Web Developer's Virtual Library, http://wdvl.internet.com/Authoring/Languages/XSL, retrieved Aug. 10, 2005.
Adam Rifkin, A Look at XML [online], http://www.webdeveloper.com/xml/xml_a_look_at_xml.html, retrieved Aug. 10, 2005.
A Flexible Commission System to Improve Your Agency Relationships, CSC: Financial Services—S3+ Contract and Commissions [online], http://www.csc-fs.com/MARKETS/detail/pc_s3_contracts.asp, retrieved Sep. 16, 2005.
PolicyLink Commission System, CSC: Financial Services [online], http://www.csc-fs.com/MARKETS/detail/la_policylinkcomm.asp, retrieved Sep. 16, 2005.
Pictorial, Inc.—Insurance and Financial Services Training [online], http://www.pictorial.com Retrieved Aug. 16, 2001.
What is AppointPak? [online], http://www.bisys-licensing.com/apptpak/whatis.htm, retrieved Aug. 16, 2001.
AppointPak Features and Benefits [online], http://www.bisys-licensing.com/apptpak/features/htm, Retrieved Sep. 16, 2005.
What is e-PAL? [online], http://www.bisys-licensing.com/palvt/whatis.htm, retrieved Sep. 16, 2005.
e-PAL Features & Benefits [online], http://www.bisys-licensing.com/palvt/features.htm, retrieved Sep. 16, 2005.
Nine e-PAL Services, Features and Benefits [online], http://www.bisys-licensing.com/palvt/serv.html, retrieved Sep. 21, 2005.
HRMS Enterprise Applications, Human Resources Management, PeopleSoft, Inc. [online], http://www.peoplesoft.com/en/us/products/applications/hrm/HRMS/hrmsea/index.html, retrieved Sep. 16, 2005.
HRMS Collaborative Applications, Human Resources Management, PeopleSoft, Inc. [online], http://www.peoplesoft.com/en/us/products/aplications/hrm/HRMS/hrmsca/index.html, retrieved Sep. 16, 2005.
Financial Planning Made Easy, American Express Financial Services [online], http://finance.americanexpress.com/sif/cda/page/0,1641,4588.00.asp, retrieved Sep. 16, 2005.
Advice and Planning, American Express Financial Services [online], http://finance.americanexpress.com/sif/cda/page/0,1641,7569,00.asp, retrieved Sep. 16, 2005.
Why ContractMaker, and How Does it Work?, Legal Contracts, Digital Contracts, Inc., [online], http://www.digicontracts.com/info/whyhow.html, retrieved Aug. 10, 2005.
Frequently Asked Questions, Digital Contracts, Inc., [online], http://www.digicontracts.com/kits/faqs.html, retrieved Aug. 10, 2005.
Information on ZipForm, 1998-2000, printed through www.archive.org.
Hansen, Hans Robert, "Wirtschaftsinformatik I," Lucius & Lucius.
Trilogy-Volvo Master License Agreement, Apr. 29, 1997.
U.S. Patent & Trademark Office, PALM Sample Printouts, published Oct. 31, 1989.
U.S. Patent & Trademark Office, Examiner's Bi-Weekly Time Worksheet (FORM PTO 690E), 1995.
Martin, James, Principles of Object-Oriented Analysis and Design, Prentice Hall, 1993.
Patent Office Professional Association, Agreement between U.S. Department of Commerce/Patent and Trademark Office and the Patent Office Professional Association, pp. 39, 93, 94, 97-100, 1986.
U.S. Patent and Trademark Office, Manual of Patent Program Procedure, published Oct. 31, 1989.
U.S. Patent and Trademark Office, PALM 3 User's Guide, published Oct. 31, 1989.
Powell et al., U.S. Appl. No. 60/216,913, filed Jul. 6, 2000, entitled "Transactional Processing Exchange System and Methods".
Protect Your Family From Lead in Your Home, May 1995, United States EPA.
SC Commission [retrieved from the Internet, http://web.Archive.org/web/1997062419305 . . . www.trilogy.com/modules/ sccommission on Feb. 4, 2002. The snapshot of this web page was downloaded to web.archive.org on Jun. 24, 1997; however, the page information states that the SC Commission web page was last modified on Mar. 12, 1997].
Selling Chain [retrieved from the Internet, http://web.archive.org/web/19970624190842/www.trilogy.com/products1 on Feb. 4, 2002. The snapshot of this web page was downloaded to web.archive.org on Jun. 24, 1997; however, the page information states that the Selling Chain web page was last modified on Mar. 6, 1997.]
Documents for U.S. Appl. No. 09/896,144 in the U.S.P.T.O.'s Patent Application Information Retrieval (PAIR) system, as of Oct. 13, 2010.
Documents for U.S. Appl. No. 09/810,515 in the U.S.P.T.O.'s Patent Application Information Retrieval (PAIR) system, as of Oct. 13, 2010.
Documents for U.S. Appl. No. 09/810,514 in the U.S.P.T.O.'s Patent Application Information Retrieval (PAIR) system, as of Oct. 13, 2010.
Documents for U.S. Appl. No. 09/810,012 in the U.S.P.T.O.'s Patent Application Information Retrival (PAIR) system, as of Oct. 13, 2010.

* cited by examiner

FRAMEWORK FOR PROCESSING SALES TRANSACTION DATA

FIELD OF THE INVENTION

This invention relates to the field of computer technology. More specifically, the invention relates to an object framework for distributor management and compensation.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Managing sales and distribution channels has become a difficult task in today's business environment where it is necessary to quickly and fairly administer incentives for salespeople and distribution channel partners while coping with regulatory issues. To keep revenues growing and keep up with customer demands, financial services providers have to move quickly even when regulation, competition and new sales distribution channels inhibit growth. Management is expected to provide new opportunities for improved revenues and margins, while providing customers with better, faster information and services.

The distribution channel model within the financial services industry is very complex. Products are sold across multiple distribution channels and the workforce is very fluid, with individual distributors working for multiple companies and engaging in multiple agreements with service providers. There are regulatory constraints on the sales force in that all distributors who sell products must be licensed and appointed, or authorized, to sell those products. Financial services companies must track all of this information about their sales force, maintain a history of all of this information, provide incentive based compensation to their sales force, and calculate their compensation based upon numerous variables. Consequently, any plan for distribution channel management must consider the number of channels, the number of distributors, compensation complexity, regulatory and licensing requirements and the number and types of products that will be sold.

Financial service companies are being driven by increased competition to consider the use of independent agents in place of captive sales staff. Firms may wish to enhance and reward cross distribution channel interactions. They must be able to enhance distributor reporting and communication and effectively manage independent brokers and captive sales staff. They must reduce the time required to market new products and implement new compensation plans and differentiate themselves based on services offered to customers. In addition, they must be able to rapidly integrate new distribution channel acquisitions and grow distribution capabilities, while reducing administration costs.

Cost avoidance is essential as mergers and acquisitions have led to many disparate systems, some of which are antiquated. Firms must reduce implementation time for new products and compensation plans on these antiquated systems and reduce the potential for overpayment. The goal must be a reduction in the overall cost of administration. Accordingly, these companies must interact with the producers (of sales) using preferred methods and quickly model new and creative compensation plans, while consolidating compensation administration systems.

In order to provide sales representatives with an incentive to sell as much as possible, or to sell more of a desired product or products at certain prices, sales organizations create incentive plans where commissions are provided or offered to the sales representatives when specific sales goals or targets are achieved during particular period of time. In addition, an incentive plan may apportion credit to everyone on a sales representative's sales team, to the representative's manager, or someone other than the sales representative himself. Sales representatives typically receive compensation based on a salary, the hours worked, and/or on the goods or services sold. When basing compensation on transactions, specifically on the goods or services sold, sales representatives receive a commission that can be based on profits, net sales, the number of products sold, or some other variable. Other primary compensation includes gross dealer concessions. Secondary compensation includes expense allowances, persistency bonuses and overrides that can be allocated among sales teams and accumulated over time if desired.

Sales compensation for direct and indirect channels can be one of the most effective levers for aligning sales performance with business goals. Unfortunately, designing and administering effective incentive programs is a difficult management challenge. The management of a business can spend a great deal of time and money in developing incentive plans. In the prior art, the creation and distribution of incentive plans is a slow process that is prone to error. It can take months to implement a new compensation plan, and dependencies on computer software can frustrate sales managers who want to make even simple changes. Moreover, a lack of measurement tools can make it impossible to develop a "closed loop", continuous improvement process. Businesses must be able to design, process, and communicate sophisticated incentive programs that drive revenue growth across all sales channels. Businesses need to streamline the administration of quotas, territories, and commissions, and also require tools to measure and improve the effectiveness of incentive programs. This would greatly simplify the management challenge of aligning tactical business performance with strategic objectives, making it possible to react more quickly and effectively to changes in market and competitive conditions.

Quotas are a necessary component of most sales compensation plans, yet they are notoriously difficult to administer, especially when they involve multiple hierarchies. Not only is it easy to introduce problems like double counting and under- or over-payment, but also changes typically require long turnaround times while they are implemented by changes in computer software. The management of sales quotas is difficult and there is a need to be able to manage them easily and accurately, allowing business users to assign quotas by territory or position and across multiple hierarchies. Managers also require a capability to accurately track sales results and forecast future performance. Needed elements include the ability to tie quotas between positions and sales teams or positions and territories, make sales projections, a provision for quick and easy quota setting and editing, and a simple interface for use from the field.

Managing sales territories involves analyzing past results, assigning territories, and forecasting future sales performance. For most organizations, it is a difficult and time-consuming process with the result that it is commonly only undertaken once a year. Unfortunately, market conditions change continuously, making it practically impossible to keep sales territories aligned with business needs for more than a short period of time. A more automated process for territory management is needed to allow large sales organizations to keep up with the market.

Another need of firms in financial services is an ability to manage sales producer payment accounts by defining multiple accounts per representative, setting up payment rules for each account and procedures for adjustments. Loan issuance against customer accounts must also be managed. Loan and repayment schedules, and appropriate records, must be maintained. As a part of this activity, it is necessary to track eligible compensation against parameters established for the loan and to be able to track collection of the loan and initiate chargeback and from the producer if appropriate.

In the area of distributor administration, firms also would like to manage a shared repository for all producer information, including personal information, professional information and preferences. There is a need to provide a view of the roles played by individuals with an organization, and active selling agreements and reporting relationships. Firms would like a centralized distributor repository in order to be able to view, report and compensate producer relationships individually and holistically. In addition, they must reduce errors or miscalculations leading to overpayment. At the same time, these firms must assist new agent distribution channels in learning how to sell new types of products and create new distribution capabilities for existing products.

Credential management is a critical issue for many firms. They must track professional accreditation including licenses, appointments, National Association of Securities Dealers (NASD) registration and continuing education requirements for the maintenance of these professional accreditations to ensure that they are represented by appropriately credentialed representatives. This need is made more acute by constantly changing government rules and regulations, as well as by different regulations imposed by the different jurisdictions in which a firm operates. Firms must determine when renewal processing is required and manage new and renewal application processes to ensure regulatory compliance in every jurisdiction. A further problem is presented by representatives who may move from jurisdiction to jurisdiction in the course of their representation of a firm. Further, there is substantial turnover in representation resulting in a continuing need to ascertain the credentials of new representatives as well as to maintain contact with former representatives in the event that issues arise from their former representation.

In order to appropriately manage their representatives, firms must also be able to create customized contracts and selling agreements by combining reusable compensation components and personalizing agreement templates to fit individual producers. A selling contract defines a hierarchy of sales people that can sell products under that contract and it defines what products can be sold under that agreement. The selling contract also specifies commission schedules and identifies which sales people participate under a particular commission schedule. As multiple versions of such agreements may come into use over time, a procedure is needed to allow multiple users to maintain agreements through versioning, or version control, and a method must be provided to manage the approval process for agreement components and templates.

Any distribution management channel solution, in order to be useful, must have a capability for error correction, including manually inputting and adjusting all transaction information, making retroactive adjustments and viewing and managing ledger items. Other features that are desirable include the ability to cancel and rerun transactions.

Many financial services firms would like to be able to communicate distribution channel management information over the Internet so that producers can view the state of their relationship with a firm, including profile information, licenses, appointments, product information, contract and compensation information. Firms would also like to be able to perform modeling and "what if" analysis and have the ability to capture historical data to make strategic decisions about the effectiveness of future plans. A set of Web-based incentive management products that can be deployed to practically any sales or distribution channel would be useful. Such tools could greatly simplify the burden of designing, forecasting, launching, measuring, and refining incentives programs.

Computer software is necessary to implement the solution to these problems and fulfill the perceived needs just described. Such software commonly utilizes multiple related functions and data structures. To encapsulate these related functions and data structures, the software often utilizes a standard object oriented programming (OOP) language approach.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritances where a subclass may inherit a class definition from more than one parent class. Other programming languages support only single inheritance, where a subclass is limited to inheriting the class definition of only one parent class.

An object is a generic term that is used in the object-oriented-programming environment to refer to a module that contains related code and variables. A software application can be written using an object-oriented programming language whereby the program's functionality is implemented using objects. The encapsulation provided by objects in an object-oriented programming environment may be extended to the notion of transactions, allocations, quotas, quota details, quota states, and promotions as discussed below.

In conclusion, there is a need for a solution, implemented on a computer in an object oriented programming environment, that manages the contracts between the manufacturers of a product, which may include financial services, and the distributors of their product in an industry where there is multiple channel selling, a fluid workforce, and regulatory constraints. This solution should track information, such as contact points, payment methods, and the organizational hierarchies, on all parties in the system. It must manage regulatory information and ensure that distributors are licensed and appointed to sell the products manufactured, or distributed, by the provider. In addition, the solution must allow for compensation configuration and provide financial services companies with a toolkit for creating and modeling their complex commission schedules used to compensate their sales forces. This should include a provision for charge-back of commissions if appropriate. Also, the solution must model contracts between the financial services company, or provider, and the distributors who sell the products. The solution must calculate compensation for all distributors and should allow for access through the Internet.

SUMMARY OF THE INVENTION

The invention provides a framework for managing contracts between manufacturers of a product and the distributors of their product in an industry comprising multiple channel selling, a fluid workforce, and regulatory constraints. An embodiment of the invention provides computer object models that enable financial services companies to track information about their sales force, maintain a history of all of the information, provide incentive based compensation to their sales force, and calculate their compensation based upon numerous variables. The system referred to hereinafter as Distributor Management System Suite (DMSS) comprises a suite of applications that provide tracking information, such as contact points, payment methods, and organizational hierarchies on all parties in the system, managing regulatory information and ensuring that distributors are licensed and appointed to sell the products manufactured by the provider. The DMSS provides financial services institutions with the means to maintain distributor records, contracts, and commissions. The DMSS includes components for managing information related to distributors, validating and tracking licenses, creating customized contracts, and maintaining compensation structures. The information stored in the DMSS database includes contract components and rules, distributor financial information, bonus schedules, and license and appointment data.

In an embodiment of the invention, the DMSS allows for configuring compensations, providing financial services companies a toolkit for creating and modeling their complex commission schedules used to compensate their sales force. The DMSS provides modeling capabilities for agreements and contracts between a financial services company or provider and the distributors who sell their products. In an embodiment of the invention, the DMSS calculates compensations for all distributors, processes payments and manages debt.

In an embodiment of the invention, the DMSS comprises several components comprising management modules, a backbone, one or more data processing engines, databases, and storage management components. The backbone allows for data exchange between components of the DMSS comprising module-to-engine and engine-to-database data exchange.

In an embodiment of the invention, the DMSS comprises data processing engines. These system components are designed to draw information from the DMSS databases, process the information, and store the result in a database or in the backbone for further use by the DMSS modules and engines.

In an embodiment of the invention, the DMSS is composed of several modules comprising a distributor administration module, a license and appointment module, a selling agreements module, a debt management module, and a payment module. These modules interact with the backbone and engines to maintain relationships between financial services institutions and their distributors.

DETAILED DESCRIPTION

Figure 1:
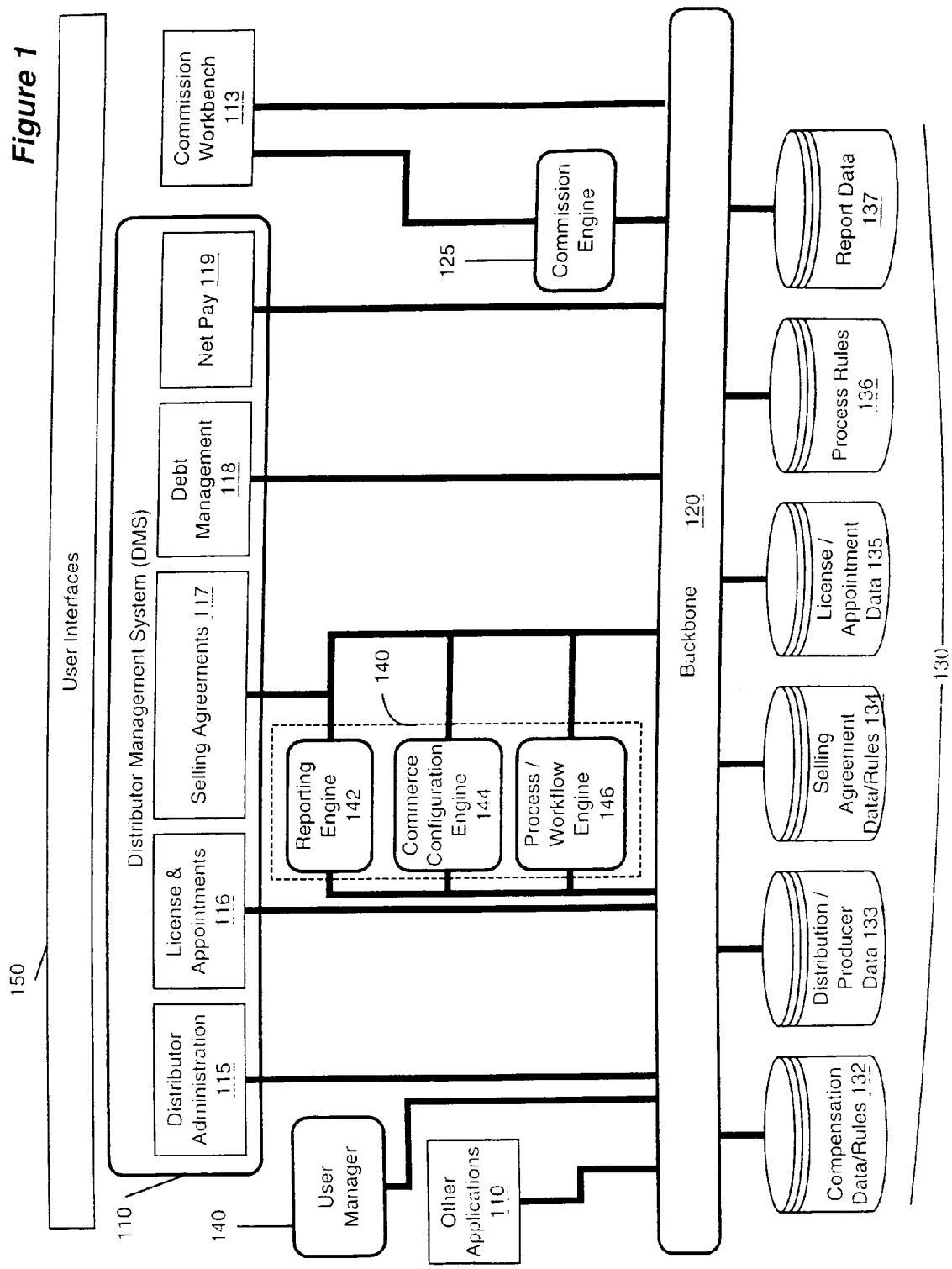
FIG. 1 shows a block diagram representing an embodiment of a system that utilizes the Distributor Management System Suite (DMSS).

The invention provides a framework for manufacturers of products to manage and compensate the distributors of their products in an industry comprising multiple channel selling, a fluid workforce, and regulatory constraints. In the following description, numerous specific details are set forth in order to provide a more thorough understanding of the invention. It will be apparent, however, to one skilled in the art, that the invention may be practiced without these specific details. In other instances, well-known features have not been described in detail in order to avoid unnecessarily obscuring the invention.

General Description

An embodiment of the invention comprises an extensible method for managing relationships between institutions (e.g., suppliers/manufacturers) of a product or service and the distributors of their product. Aspects of the invention are targeted at industries where there is multiple channel selling, a fluid workforce, and regulatory constraints upon products sales. For example, systems embodying the invention provide a way to manage the agreements that financial services companies have with the distributors who sell their products. Thus, organizations such as life insurances companies may utilize embodiments of the invention to manage the sale and distribution of life insurance plans in a way that coincides with the regulatory constraints of government organizations.

Such companies can utilize embodiments of the invention track information about the company's sales force, maintain a transaction history of the information associated with multiple products, provide incentive based compensation to the company's sales force, and calculate sales force compensation based upon numerous variables. For example, the system referred to hereinafter as Distributor Management System Suite (DMSS) comprises a suite of applications that provide tracking information, such as contact points, payment methods, and organizational hierarchies on all parties in the system, managing regulatory information and ensuring that distributors are licensed and appointed to sell the products manufactured by the provider.

In one embodiment of the invention, DMSS comprises a suite of multiple engines and modules each configured to provide functionality that helps manage the flow of information between distributors and suppliers. Generally, DMSS provides users with a mechanism for managing information related to distributors, validating and tracking licenses, creating customized contracts, and maintaining compensation structures. To perform such functions the system may store information such as contract components and rules, distributor financial information, bonus schedules, and license and appointment data. The engines and modules of DMSS may, for example, be configured to perform at least the following functions:

1) Provide financial services institutions with the means to maintain organization hierarchies associated with parties on the system (e.g., distributor records), track information such as contracts, and payment methods (e.g. commissions).
2) Manage regulatory information and ensures that distributors are licensed and appointed to sell the products manufactured by the provider.
3) Perform compensation configuration. It provides financial services companies a toolkit for creating and modeling their complex commission schedules used to compensate their sales force. For example, the system may calculate compensation for all distributors by building on top of a commission engine and using the engine, the commission models, and the agreement models to calculate the compensation for all of its sales force.
4) Models agreements or contracts between the financial services company or provider and the distributors who sell the products. These agreements are termed 'Selling Agreements'. A selling agreement defines a hierarchy of sales people that can sell products under that contract, it defines what products can be sold in that agreement, it defines what commission schedules can be used in that agreement, and it defines which sales people participate in which commission schedule. The DMSS may utilize the terms defined in selling agreements to calculate compensations for all distributors.
5) Managing information related to distributors, validating and tracking licenses, creating customized contracts, and maintaining compensation structures. The information stored in the DMSS database comprises information such as contract components and rules, distributor financial information, bonus schedules, and license and appointment data.
6) Manages payment and debt to distributors/sales representatives (e.g., net-pay and debt management).

In accordance with one embodiment of the invention DMSS is built on top of a commission engine configured to model and calculate commission for the sales force. A commission engine takes two inputs, a commission model and a set of transactions, and generates ledger items (that correspond to payments) as output. Each transaction represents a physical sales transaction, such as distributor selling a life insurance policy. The commission model represents two critical pieces of data: the sales team hierarchy and the commission schedules. The sales team hierarchy comprises a hierarchy of all sales people that will be responsible for a transaction. The commission schedules define formula for translating transactions into ledger items. Commission schedules may be modeled through quotas, bonuses, and plans object. The commission model utilized in one or more embodiments of the invention is described in further detail in pending patent application Ser. No. 09/081857, entitled "Method and Apparatus For Determining Commission", which in incorporated herein by reference.

DMSS complements the commission engine in that it provides a mechanism for modeling selling agreements with commission models. In accordance with one embodiment of the invention, one commission model exists for each selling agreement in DMSS. Agreement hierarchies are modeled within the sales team hierarchy. The agreement commission schedules are stored in accordance with one embodiment of the invention in the commission model's quota, bonus, and plan objects.

The commission schedules used in an agreement are often the same or similar across agreements. Therefore, the agreements are put together from contract kits. A contract kit contains a set of commission schedules (also referred to as compensation components) that can be used within an agreement. Each compensation component and contract kit is versioned, and the compensation component contains the commission schedule information needed to generate a complete commission schedule in the commission model. Each agreement is then created from one contract kit, and when the agreement is created a user can selected which components from the kit to include in the agreement. When a new version of a component or kit is created, a user can select to cascade the new version to all the agreements that use it, or to leave the agreement using the old version.

DMS provides additional functionality by allowing dependencies between models through linked hierarchies and pooling agreements. It is often common for one party to receive credit or rollup from somebody's work in a different agreement. This is accomplished through linked hierarchies. A distributor (Ted) in one agreement (AG1) make be linked to another distributor (Fred) in another agreement (AG2). This allows transactions for Fred and all of his descendants to also be credited to Ted.

It is also common for multiple parties to want to share work across agreements. For example, one may wish to use one quota to calculate qualification on a quota level, and another quota to calculate payout. In this example, one would want several parties performance to contribute to the qualification quota, even parties in different agreements. Pooling agreements provide this functionality, by pooling work from different agreement participants from potentially different agreements into one quota. An extensible object model in accordance with one embodiment of the invention provides a framework for representing such agreements.

System Components

FIG. 1 shows a block diagram representing an embodiment of a system that utilizes the Distributor Management System Suite (DMSS) 105. As shown in FIG. 1, the DMSS comprises management modules 110, a backbone 120 allowing data exchange between applications and databases, and between applications, a commission engine 125, a number of additional data processing engines 140, and data storage and storage management components 130. The DMSS is also configured to allow for the addition of more applications and plugins 110 to provide additional services.

In an embodiment of the invention, the DMS comprises several modules and applications. In this example, the system is used by financial organizations to manage sales agreements, distributor credentials, and sales compensation. However, the reader should note that the system embodying the invention is also applicable outside of the financial services industry and that the term financial organization is utilized for illustrative purpose only. The invention is not limited solely to the financial services industry, but may be applied to other industries. For example, the system may be utilized in any business environment having a need to determine if individuals associated with a sale are appropriately licensed, compensated. The invention may also be applied to other business situations were companies must operate pursuant to the terms of an agreement.

DMSS comprises a DMS Database which may exchange data with modules and engines via backbone 120. In accordance with one embodiment of the invention, backbone 120 comprises an information infrastructure used to integrate applications 110, engines 140 and 125, and databases 130. Backbone 120 facilitates communication between data resources and modules, and integration of different computing equipment, including local networks, web interfaces, and back-office systems. Thus, backbone 120 provides a mechanism for maintaining data storage and retrieval, in addition to communicating changes and updates to the other modules. Backbone 120 is configured to retrieve data from the database in response to the needs of DMSS modules and engines and transmit that data to its requestor. Backbone 120 provides an extensible framework suitable for building and integrating applications customized for the needs of individual clients. Backbone 120 receives information from the DMSS modules and acts on it, storing the resulting object or sending it back to the module. As modules perform their tasks and functions, the backbone communicates changes and updates to the rest of the applications. Backbone 120 also provides communication between the modules by sharing data and functions. The DMSS and other applications 110, engines 140, and databases 130 may execute bi-directional requests and responses across backbone 120. Backbone 120 is configured to retrieve data from the database in response to the needs of DMSS modules and engines and transmit that data to its requester. Backbone 120 eliminates some of the need for developing custom code, and allows developers to integrate new applications without knowing all the other applications in the system.

Engines 140 and 125 may be launched by the DMSS modules via the backbone and draw information from the DMSS databases. The engines process the information, and store the resulting object in a database or the backbone for further use by the DMSS modules and engines. A commission engine 125, configured in accordance with one embodiment of the invention, utilizes backbone 120 to gather information about agreements from the database. Commission engine 125 may, for example, identify relevant data in the database and produce a set of objects. Once the engine has processed all the objects, commission engine 125 can generate payments based on the agreements.

Workflow process engine 146, operating in accordance with one embodiment of the invention, starts and responds to workflow events received from the DMSS modules through backbone 120. Workflow process engine 146 completes the desired workflow event and sends that information back through backbone 120. In an embodiment of the invention workflow engine 146 enables users to create and run one or more business processes. The processes may be created in a formatted data input (e.g. XML or Java) and become objects (business rules) in the backbone. The workflow engine 146 enables the flow of information in the DMSS and provides users with a customizable mechanism for creating business processes.

The DMSS may comprise a commerce configuration engine 144 that allows users to define and enforce the set of rules governing how contract kit components (e.g., document components and compensation components) are combined into agreements for each distributor. The internal processes utilized by configuration engine 144 are described in further detail in U.S. Pat. No. 5,825,651, entitled "Method and Apparatus For Maintaining and Configuring System", which in incorporated herein by reference. The commerce configuration engine 144 runs the contract kit for creating agreements between a distributor and a financial services company.

A reporting engine 142 may be added to the DMSS and configured to generate reports and store such reports in the database. Each component of an agreement may have a corresponding document, generated from report templates, which describes that component. The DMSS may also have several modules additional modules comprising a distributor administration module 115, a license and appointment module 116, a selling agreements module 117, a debt management module 118, and a payment module to which is may be referred to also as Net Pay module 119. These modules interact with backbone 120 and engines to maintain relationships between financial services institutions and their distributors.

In one embodiment of the invention, distributor administration module 115 enables a financial services institution to record and track a broad set of information associated with the institution's distributors. The distributor information may be stored in a central database and used by all other modules of the DMS suite. Distributor information may comprise personal contact information (e.g. address, telephone, facsimile, email etc.), including information about multiple contact points, information from background checks (e.g. education, previous relationships with financial services institutions, personal credentials etc.), financial information (e.g. bank address/account information and payment, advance, repayment history etc.), license and appointment information (e.g. state and product eligibility), including current and historical license and appointment data, information about errors and omissions coverage.

Distributor information may also comprise any other type of information associated with the distributor and/or the sales of product on behalf of the institution. Distributor administration module 115 may also provide services for creating and managing distributor database information, setting up organizational entities, such as sales teams, placing individual distributors in the teams, modifying the distributor information, and creating and managing a repository for data about selling agreements established between the financial services institutions and distributors. Also, distributor administration module 115 may provide services for defining and managing relationships between different organizations (e.g. such as the financial services institution and a distributor or between regional directors and sales offices), identifying and managing calendar-based events associated with distributors such as selling agreement, licensing, and appointment renewals, background check renewals, and errors and omissions coverage renewals.

A licensing and appointments module 116 may also be integrated into the DMSS and configured to enable financial services institutions to manage the license and appointment credentials for distributors and to validate compliance with industry regulations. The licensing and appointment rules enforced by the DMS suite are applied to distributors managed by the system, whether they are employees of the financial services institution or employed by an external distributor. However, the licensing and appointment rules may be selectively enforced in the event that a user defines a set of rules defined a decision tree for performing selective enforcement.

Licensing and appointments module 116 may also provide several services comprising defining license/appointment types by company, state, and either product or product line, determining the license and appointment requirements for producers (e.g., distributors or sales representatives) based on their state of operation, the products the producer sells, the kind of compensation paid to such producers and their role, monitoring license and appointment information associated with individual producers on a calendar and schedule basis and determine when renewal application processing is required, managing the license application process for renewals, updating licenses (e.g. for new products or states). In one embodiment of the invention, licensing and appointments module 116 includes the documentation and workflow for the application approval process providing services comprising managing the appointment application process for both renewals and new appointment requests, including the documentation and workflow for the application approval process, providing license and appointment checking as required (e.g. for sales compensation or processing new business), validating that licensing/appointment requirements are met and holding activity until requirements are met.

When selling agreements module 117 is integrated into the DMSS in accordance with one embodiment of the invention, the selling and agreements module 117 enables a financial services institution to define and create individual business contracts with distributors. A selling agreement defines the scope and terms of the relationship between the parties involved, commission and bonus schedules, and documents describing the relationship. In one embodiment of the invention, each selling agreement defines a hierarchy of sales people that can sell products under that contract, it defines what products can be sold in that agreement, it defines what commission schedules can be used in that agreement, and it defines which sales people participate in which commission schedule. Selling agreements are built from pre-defined contract kit components customized during negotiations. For example, a selling agreement may be formulated using contract kits comprised of components such as compensation components and document components. Each selling agreement is assembled by the system using rules (e.g., a component may be required, optional, or standard) defining the relationships between each of the components. Compensation components define the commission structure associated with a product to be sold and document components provide other information related to the agreement (e.g., contract terms etc . . . ).

The distributor's performance is measured and commission is paid according to the terms of the agreement (e.g., defined in compensation components). In an embodiment of the invention, customizable contract kit components enable a financial services institution to define the content of contracts and the processes by which they are administered. The kits detail the rules and documentation required for the administration of the agreement. A financial services institution defines the events that may occur and provides a set of possible responses to each event using various contract kit components. Selling agreements module 117 may use contract kits to perform several tasks comprising: defining agreements that consist of contract components, defining the set of rules governing how contract kit components are combined into selling agreements for each distributor, managing the approval process for contract kit components and contract kits prior to their promotion to active use, activating contract kit components and contract kits for use, retiring contract kit components from active use, integrating with the commission engine to enable compensation calculations based upon the parameters set in the selling agreement.

In an embodiment of the invention, DMSS comprises an integrated debt management module 118 which enables a financial services institution to manage distributor advances and repayments. The debt management module enables a user to define and manage the business rules and parameters for the approval and payment of advances (e.g., via an interface). A user may make adjustments to advance balances based on actual value received from commission and accelerate repayment schedules if commissions are insufficient. The debt management module enables a user to define the rules and parameters associated with advances. The debt management module enables a user to define the following: classes of distributors who qualify for advances, qualification criteria for advances (e.g. the distributor's length of service, sales history, and past earnings), ratio of advances to projected income, taking into account any outstanding advances, repayment schedule and interest rate to be paid, source of repayment income or the policy the advance is to be recouped from, whether the amount is a percentage or flat rate, accelerated repayment schedules. For example, if a distributor's income projections fall below repayments, a user may modify the repayment terms, a user may also perform other activities such as initiating advances and repayment schedules, and tracking performance of debts.

The DMSS may also comprise a payment module 119 that enables financial institutions to track and calculate payments to distributors. Payment module 119 (also referred to as a net pay module) determines a distributor's net pay by adjusting the party's total earned compensation (calculated by commission engine 125) according to a set of payment adjustment rules. The commission engine utilized in one embodiment of the invention is described in further detail in pending patent application Ser. No. 09/081,857, entitled "Method and Apparatus For Determining Commission", which in incorporated herein by reference. These rules can be used to capture repayment schedules for outstanding debt, and transfer payments to an alternate payee. In accordance with one embodiment of the invention, payment module 119 also allows splitting up net payments into individual disbursements, directing different parts of compensation to different accounts.

In one embodiment of the invention DMSS may also comprise a user manager application 140 which defines and restricts user access and usage of the DMS suite. The system may use role-based access control, where roles are given specific permissions to data and entities. Users of the DMS suite have several levels of usage and control in the application based on the pre-defined roles. A user may customize these roles through the application user manager 140.

In an embodiment of the invention, a workbench application 113 is provided to enable users to view and manage sales transactions and distributor performance data, and to run the DMS engine.

The DMSS comprises, in addition to modules and engines, a set of user interfaces 150. User interfaces comprise a browser-based system for managing the DMSS applications. This browser-based system may be implemented using any network enabling communication protocols and applications. For example, the browser-based user interface may include Java Server Pages, script based common gateway interface or any application capable of accessing the databases and producing intangible data that can be rendered by a client browser.

Information Types

In an embodiment of the invention, the DMSS comprises several types of data stored in the databases and corresponding modules, and used in module-to-module, module-to-engine, and engine-to-engine communication. The system may represent such data in data objects. Compensation data and compensation rules data objects 132 store information for the agreements module of the DMSS. This data may include contract components such as quota levels, bonus rules, and commission-based rules for eligibility. Distributor data and producer data objects 133 store information about a financial services institution's distributors for the distributor administration 115 and the other modules of the DMSS. This data includes contact information, background checks, continuing education credits, and financial information.

Selling agreements data and selling agreement rules data objects 134 provides sharing data with the Agreements module 117 of the DMSS. Information in this database includes rules for contracts between financial services institutions and distributors, data defining the terms of contracts, and commission and bonus schedules. License data and appointment data objects 135 are used by the license and appointments module 116 of the DMSS. This data includes license and appointment credentials and variations of license and appointment types (such as variations by state or product). The data is also used to validate that requirements for a license are met. Process rules data objects 136 contain information relating to the DMSS workflow service. This data includes agreement components and business rules and data. Report data objects 137 contain report data and agreement components and may share information with the report engine.

System Components Interactions

In an embodiment of the invention, modules perform their tasks and functions using the backbone 120. The backbone 120 communicates changes and updates to the rest of the applications. The Backbone also provides communication between the modules by sharing data and functions. The backbone 120 maintains data storage and retrieval, in addition to communicating changes and updates to the other modules. The backbone retrieves data from the database in response to requests from DMSS modules and engines and transmits that data to its requester.

Figure 2:
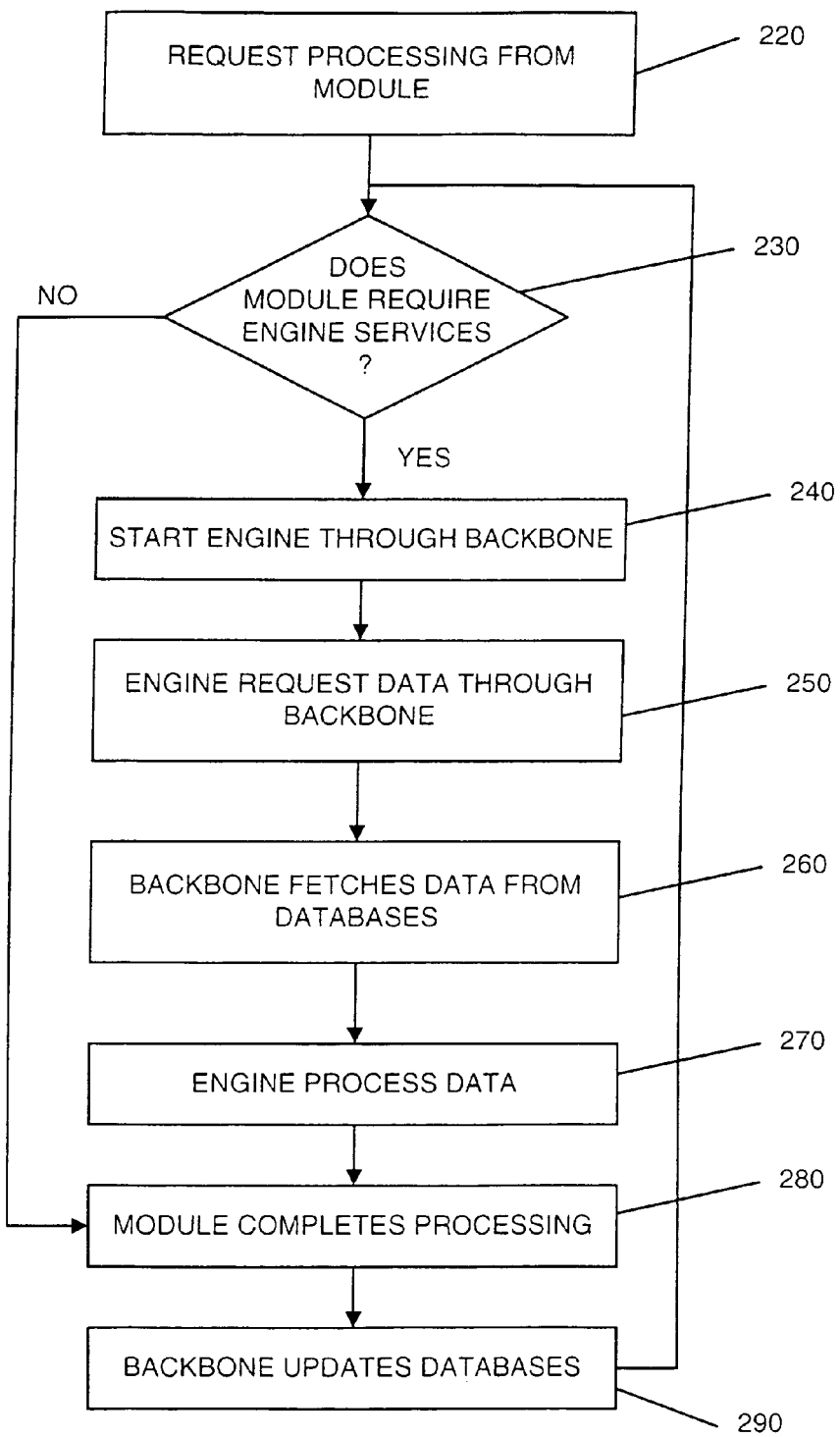
FIG. 2 comprises a flowchart showing the process of communicating between modules, the data processing engine, the DMSS backbone and the databases in an embodiment of the invention.

FIG. 2 is a flowchart showing the process of communicating between modules, the data processing engine, the DMSS backbone and the databases in an embodiment of the invention. In step 220 a request is received by the DMSS to perform a data processing task. This step involves starting the modules required to handle the data processing task. The module data processing task may require one or more services provided by specific data processing engines. The module determines, if a specific engine's services are needed in step 230 and starts the designated engine by issuing a request through the backbone in step 240. The engine requests the data necessary for processing the modules request in step 250 though the backbone. The backbone fetches the data from different sources of databases in step 260. The engine processes the modules request in step 270 and returns the processing result through the backbone to the module. The module completes the processing in step 280 and continues processing the data. The backbone updates the databases and other modules in the DMSS in step 290.

Figure 3:
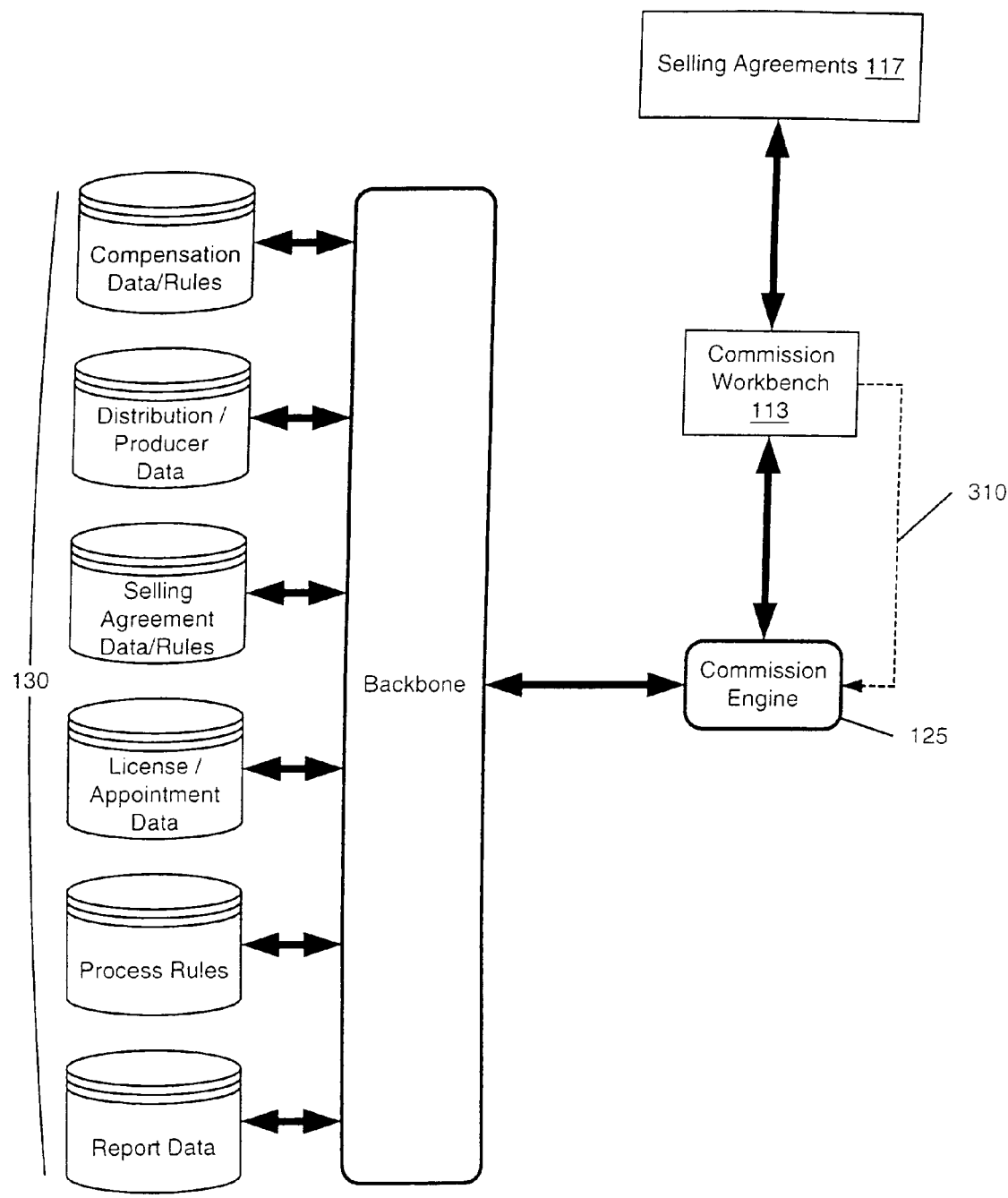
FIG. 3 show a block diagram representing an example of interactions occurring within DMSS modules and engines in an embodiment of the invention.

FIG. 3 show a block diagram representing an example of interactions occurring within DMSS modules and engines in an embodiment of the invention. In this example, the selling agreements module 117 of the DMSS, acts through the workbench 113. The workbench 113 starts commission engine 125 by sending a request 310. In response, the engine obtains the appropriate agreements information from the databases via the backbone 120 for its calculations and compensation functions. The commission engine gathers information about agreements from the database through the backbone. The commission engine identifies relevant data in the database and produces a set of objects for the selling agreements module. Once the engine has processed all the objects, it can generate payments based on the agreements. The resulting information is stored in the database for extraction by the DMSS applications.

Figure 5:
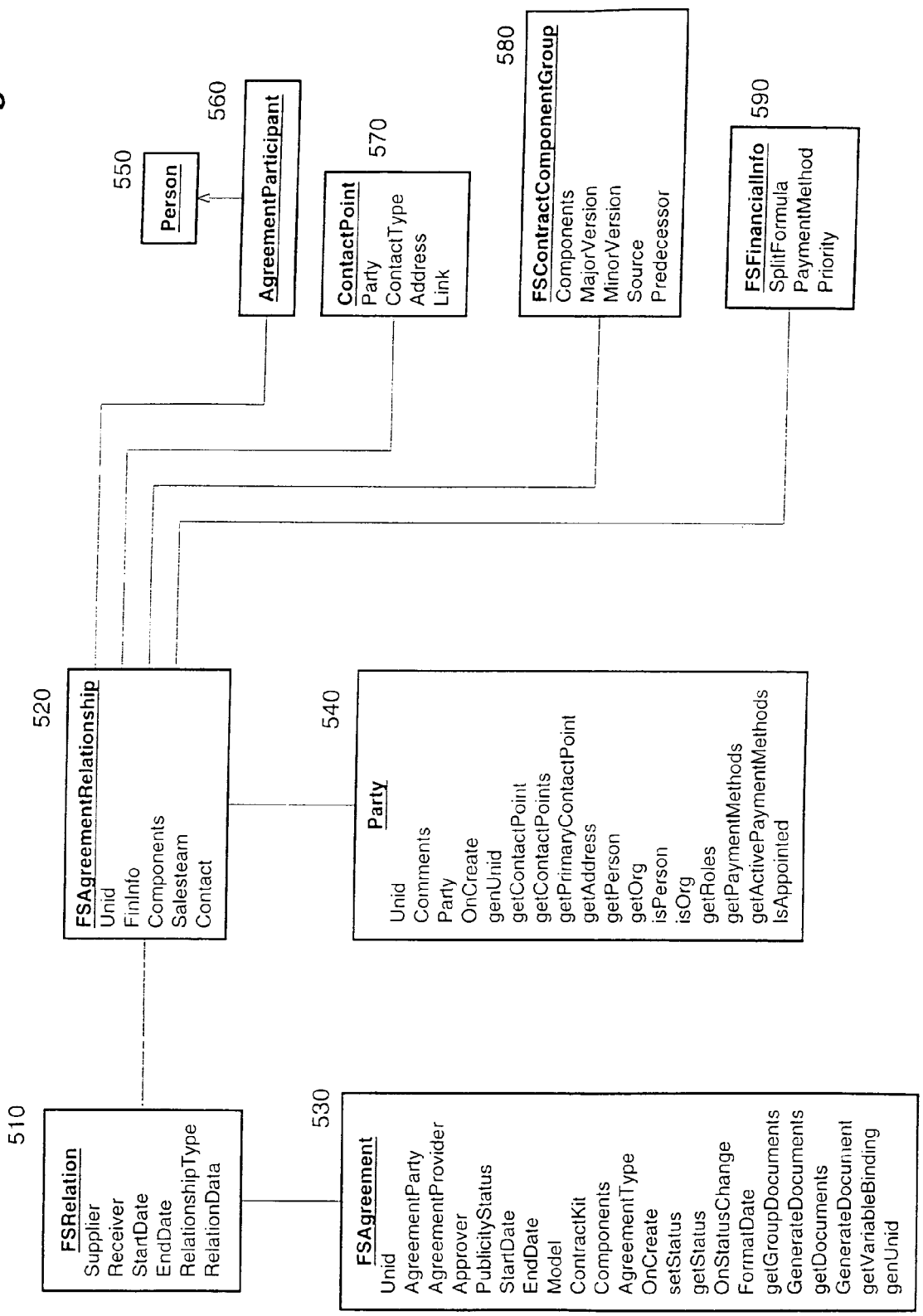
FIG. 5 is an illustration of the classes that define the relationship between the parties in a DMSS.

FIG. 5 provides an illustration of the process flow utilized in accordance with one or more embodiments of the invention. The figures shows that the system described above may be utilized to generate the selling agreement that defines a relationship between multiple parties (e.g., step 500). Once the selling agreement is generated the system may determine a commission amount associated with a sales transaction performed by one of the parties based on said selling agreement (e.g., step 502). However, before the system pays out the commission amount it may determine if the parties associated with the sales transaction conform to regulatory or business requirements (e.g., step 504). For example, the system may determine whether the parties are validly licensed or authorized to perform such sales transactions. If the second party is not validly licensed, the system may reject the sales transaction (e.g., step, 506). Once that determination is performed the system may distribute an appropriate payment (e.g., commission amount) to individuals associated with said sales transaction (e.g., step 508). In one embodiment of the invention, the distributed amount takes into account any deductions or credits (e.g., via the payment engine or debt engine) that are to be applied to the commission amount. For example, the person responsible for the transaction (e.g., sales representative) may be paid some amount minus an amount owed.

Computer Execution Environment (Hardware)

Figure 4:
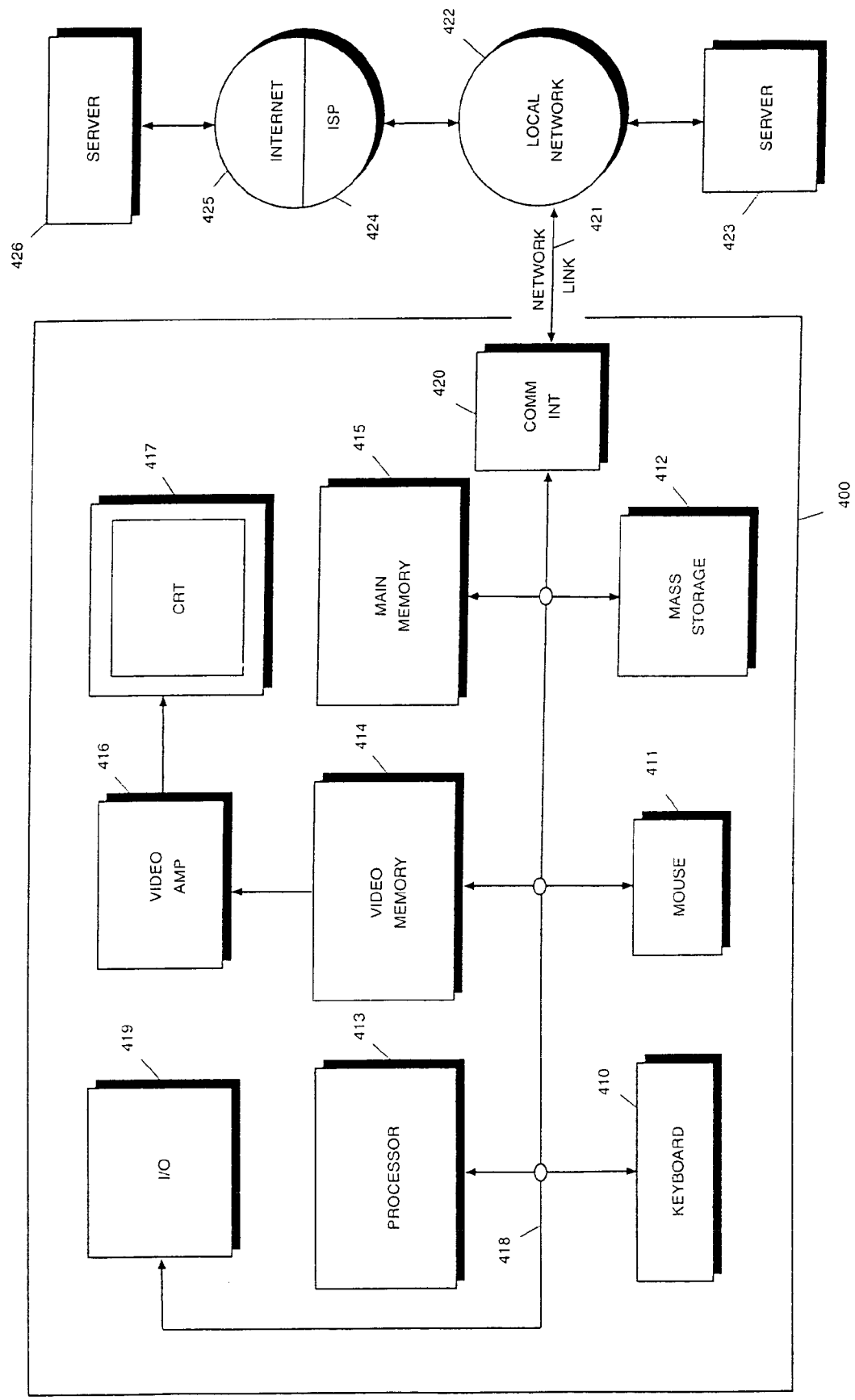
FIG. 4 shows a hardware environment for executing one or more aspects of the invention.

An embodiment of the invention can be implemented as computer software in the form of computer readable code executed on a general purpose computer such as computer 400 illustrated in FIG. 4, or in the form of byte code class files executable within a Java™ runtime environment running on such a computer, or in the form of byte codes running on a processor (or devices enabled to process byte codes) existing in a distributed environment (e.g., one or more processors on a network). A keyboard 410 and mouse 411 are coupled to a system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to system bus 418 represents such I/O elements as a printer, A/V (audio/video) I/O, etc.

Computer 400 includes a video memory 414, main memory 415 and mass storage 412, all coupled to system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 64-bit data bus for transferring data between and among the components, such as processor 413, main memory 415, video memory 414 and mass storage 412. Alternatively, multiplex data/address lines may be used instead of separate data and address lines.

In one embodiment of the invention, the processor 413 is any suitable microprocessor or microcomputer for processing data. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Wireless links are also possible. In any such implementation, communication interface 420 sends and receives electrical, electromagnetic or optical signals that carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 424. ISP 424 in turn provides data communication services through the worldwide packet data communication network now commonly referred to as the "Internet" 425. Local network 422 and Internet 425 both use electrical, electromagnetic or optical signals that carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420.

Processor 413 may execute the received code as it is received, and/or stored in mass storage 412, or other non-volatile storage for later execution. In this manner, computer 400 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems programs, apparatus, and/or methods described above are for purposes of example only. An embodiment of the invention may be implemented in any type of computer system or programming or processing environment.

Data Object Models

In an embodiment of the invention, the DMSS may be adapted to fulfill a given financial services institution's requirements. DMSS comprises a data object model allowing it to be customized to specific company or organization's needs. For example, in setting up the system, several standard functions, such as defining organizational hierarchies may be customized in a standard implementation. DMSS enables clients to create parties (e.g. individuals or organizations) in the system by entering their information such as contact points (e.g. address information) and contact point usages and also enables companies to assign roles to parties. Users may add new roles in addition to the roles already included in the system as part of the default roles setting. The DMSS enables users to record financial information for parties who are individuals. If a new party is a distributor, the user may record license and appointment information. The DMSS enables users to create agreements from contract kits, and define compensation. Users may customize the compensation components of the agreement. For example, a user may change the payout rate for a type of bonus. The DMSS enables users to define hierarchical relationships for distributors; thus, placing distributors into sales team hierarchies, which may be the basis for selling agreements and compensation distribution. Users may select members of an agreement's sales team hierarchy as participants of the agreement's compensation components; thus, determining how a sales team member will be compensated.

In an embodiment of the invention, in addition to setting up the DMSS, a user may perform ongoing updates as new parties and new contract kits are created. Several updates may be applied to the DMSS such as scheduling payments as part of the compensation components of the contract kit, setting up advances, which are paid according to a set of rules that determine if a distributor is eligible for an advance, and using the classes in the Net Pay module to customize payment methods and accounting adjustments.

FIG. 5 is an illustration of the classes that define the relationship between the parties in a DMSS. The relationship model comprises the FSRelation class 510, the FSAgreementRelationship class 520, the FSAgreement class 530, the Party class 540, the Person object 550, the AgreementParticipant class 560 which invokes Person object 550, the ContactPoint class 570, the FSContractComponentGroup class 580, and the FSFinancialInfo class 590.

Party Object Model

In an embodiment of the invention, the party object includes classes for defining a party in the DMSS. It also includes classes for detailing roles and contact points.

Some objects in DMSS map directly to their business counterparts. A contact point may be a street address, along with telephone numbers and perhaps an email address, i.e., information that can be used to contact an individual or an organization. Other objects in DMSS, however, represent more general concepts and require some explanation.

Party is the simplest abstraction, and represents either an individual or an organization. The reason for generalizing with party objects, rather than person and organization objects is that it does not matter whether the party participating in an agreement's rollup hierarchy is an individual or an organization. Party serves as a useful placeholder for either concept. When additional details need to be recorded, a user creates a link in the party object to the actual person or organization. Parties are stored as FSParty instances.

The party class contains information required for all parties. It also (through FSRoles and FSRelationships that point back to the party) contains all other information about the party. In an embodiment of the invention the party object possess the following properties: "Unid" denoting a String identifier that should be unique for each party in the system. Automatically assigned in the OnCreate method, "Comments" denoting an arbitrary comment on the party, "Party" denoting a link to either an SCPerson (for individuals) or an SCOrganization (for organizations).

In an embodiment of the invention, the party object provides the following functions:

OnCreate: Called at creation of a new party. The default implementation calls genUnid to assign a unique ID to each new party.

genUnid Generates a unique ID for each party (should only be called through OnCreate). Default implementation generates monotonically increasing, though not necessarily consecutive, integer ID.

getContactPoint Returns the contact point with specified contact point usage valid for the specified date. If the party has linked contact points, this may return another party's contact point, but it is guaranteed to return some contact point, because every party must have a primary contact point defined.

getContactPoints Returns set of all contact points for this party.

getPrimaryContactPoint Returns the primary contact for the party (one and only one defined for each party).

getAddress Returns the address on the party's real party, that is the SCPerson or SCOrganization. This may be null, if the primary contact point is actually a link to another party's contact point.

getPerson Returns the SCPerson the party points to, if any.

getOrg Returns the SCOrganization the party points to, if any.

isPerson Returns whether the party points to a person (if so, getPerson( ) should return non-null).

isOrg Returns whether the party points to an organization (if so, getOrg( ) should return non-null).

getRoles Returns all roles played by the party.

getPaymentMethods Returns all the party's payment methods.

getActivePaymentMethods Returns the payment methods for a party that are active on the specified date.

IsAppointed is a convenient method for calling the IsAppointed method on the Distributor class (if the party is a distributor).

Role Object Model

In an embodiment of the invention, role object class contains instances of the roles played by a party.

As with Party, Role is an abstract concept within the DMSS software. In the DMSS the role object indicates the business role that a party plays. For example, a key role is that of distributor. Once a party is designated as a distributor, it can hold licenses and appointments, participate in a selling agreement's rollup hierarchy, and so on. A party can play none, some or all possible roles. The DMSS comprises the following roles included as default with the DMSS:

Distributor—Can participate in selling agreement, specifically can maintain position in the rollup hierarchy; can hold licenses and appointments, errors and omissions (E&O) coverage, and education credits.

Financial Services Institution—Can be the owner of a contract kit, owner of Contract Inventory List, as well as the provider for a selling agreement.

Employer—Although this role is infrequently used, it could be set up as a marker.

Alternate Payee—Can be set up to receive pay instead of the party who earned the compensation. This role is useful for managers or trainers receiving compensation for trainees' compensation.

In an embodiment of the invention, the role object maintains a link to the party for which it was created, an indicator of its type, such as distributor or employee, which is required because all roles are stored in a common table, a link to extra data the nature of which depends on the role type.

Role Manage Object

The Role Manager is used to maintain the list of known role types. At a low-level, the Role Manager provides an Application Programming Interface (API) to access the list of known role types, and for each type its Query interface that locates the party's instance of this role type (if one exists). The role manager object provides the party's instance with a validation interface that assists in consistent creation and editing of roles. The validation interface provides a method to check whether the party can play a given role, and a constructor to ensure consistent creation and editing. It can be used for creating roles. Either an existing role object is specified, or one will be created. Provides a method to set the party. On completion, if all requirements are satisfied, the result is modified and a new role ready for saving.

The role manager had a RoleType that is an Integer corresponding to role type as defined by the Role Manager, and a RoleData object linked to role type-specific data for this particular role instance.

Contact Point Object Model

In an embodiment of the invention, Contact point classes hold contact information about parties, directly (through the Address field) or indirectly (through the Link field). Every party must possess at least one contact point, and exactly one of its contact points must be designated as the Primary contact point. Each contact point has zero or more dated usages. Contact points are referenced indirectly through FSContactPointLink.

In an embodiment of the invention, Contact point classes have the several properties comprising:

Party Back-pointer to party that owns the contact point.

ContactType Integer as defined by the contact type enumeration (for example, Residence or Office) that specifies the contact point's type.

Address Link to an SCAddress is non-null unless this contact point is only a link to another through its Link property. On the primary contact point, if not linked, is a link to the SCAddress on the party's SCPerson or SCOrganization.

Link FSContactPointLink, which if non-null, indicates this contact point is only a pointer to another party's contact point (see FSContactPointLink for description).

Contact Point Usage Object Model

In an embodiment of the invention, each contact point has zero or more usages. Each usage has a start and end date. There can be at most one usage valid for a date of a given usage type for each party. Contact point usage object model has several properties comprising a Party (a Back-pointer to party that owns the contact point), a Contact Type (an Integer as defined by the contact type enumeration that specifies the contact point's type), and Address object linking to an SCAddress, a non-null unless this contact point is only a link to another through its Link property. On the primary contact point, if not linked, is a link to the SCAddress on the party's SCPerson or SCOrganization and a link FSContactPointLink, which if non-null, indicates this contact point is only a pointer to another party's contact point.

Relationship Object Model

In an embodiment of the invention, like Role and Party object models, Relationship is an abstract object, representing a general concept within the DMSS software. Unlike a contact point, which is straightforward contact information, a Relationship is more complex.

The Relationship object is used to model a relationship between two objects, a supplier and a receiver, for example. These terms do not always represent a literal supplier and receiver.

The relationship lasts for a specified span of time. It contains:

1. A link to the first object, denoted the supplier.
2. A link to the second object, denoted the receiver.
3. Start and end date for the relationship.
4. An indicator, designating the relationship type.
5. A link to extra (type-specific) data.
6. A link to its owning hierarchy (discussed in the hierarchies section, only relevant for hierarchical relationships).

There are two types of relationships: those that define a specific hierarchy and those that are non-hierarchical. The DMSS suite includes one type of non-hierarchical relationship, Agreement Relationships, discussed below.

Agreement Relationship Object Model

In an embodiment of the invention, an agreement relationship associates two parties participating in a selling agreement for a specified period of time. The supplier in this case is the party object and the receiver is the agreement object itself. The relationship manager for agreement relationships stores the relationship type. The extra data for this relationship type is an FSAgreementRelationship object, which holds information about relationships, such as the contact point to be used and financial information. As with all hierarchical or non-hierarchical relationships an object can be involved in several relationships simultaneously or sequentially. The type of the supplier and receiver is not restricted. Each relationship type can impose requirements through the validation interface registered with the relationship manager.

Relationship Manager Object Model

In an embodiment of the invention, relationship objects may be added through the Relationship Manager. The relationship manager maintains the list of known relationship types. At a low-level, the Relationship Manager provides an API to access a list of known relationship types and information about each type. The Relationship Manager provides two interfaces for accessing types and information:

1. Query interface: Find all relationships of a particular type where the specified object is supplier (may be constrained by date). Find all relationships of a particular type where the specified object is receiver (may be constrained by date). Find all relationships of this type where the specified object is receiver or supplier (may be constrained by date).

2. Validation interface—used for consistent creation/editing of relationships. Provides: a method to check whether a specified pair of objects can act as supplier or receiver of this relationship type; a constructor to ensure consistent creation/editing; can be used for programmatic creation of relationships. Either an existing relationship object is specified, or one will be created. The constructor provides a method to set the party. On completion, if everything is consistent, the result is modified and the new relationship is ready to be saved.

The base implementation of the query interface carries out the obvious queries. The base implementation of the validation interface checks that the supplier and receiver are non-null. To add the agreement relationship, the default query implementation is used, but the validation implementation is extended to create the entry in FSAgreementRelationship if creating a new relationship, and to verify that one is specified on completion.

Hierarchical Relationships Object Model

In an embodiment of the invention, the DMSS allows an arbitrary number and variety of hierarchies of parties. These hierarchies play an important role in DMSS software. They may be used to build organizational structure as well as define compensation relationships for sales agreements. They may also be used to build sales team structures. Normally, a company's hierarchies may be defined during set up; however, the DMSS comprises a few sample hierarchies discussed below.

1. Organization Hierarchy—A typical organization chart, with the top level defined as Company. The hierarchy is built according to these rules: each company can have anything under it; each CEO can have anything but another CEO or a company under it; each president can have anything but another president, company, or CEO under it; each vice-president can have anything but a president, another vice-president, a CEO, or a company under it; each manager can have a manager or a clerk under it; clerks do not have levels under them.

2. Sales Team Hierarchy—There are two hierarchy types defined for sales team hierarchies: SalesTeam hierarchy and SimpleSalesTeam hierarchy.

Hierarchy Manager Object Model

In an embodiment of the invention, hierarchies are supported through the hierarchy class and a family of highly restricted relationships. The type of hierarchies is maintained through the Hierarchy Manager, analogous to the role and relationship managers. For each type of hierarchy, the manager must be supplied with a list of relationship types that can serve to define the top of the hierarchy. These types may take a hierarchy object as supplier, and a party as receiver.

For each top-level relationship type, there is a list of additional relationship types that can be nested underneath them. Each of the nested types may take a relationship (its parent's relationship) as supplier and party as receiver. The concept is less complex than it first appears. For example, to implement the employment hierarchy, the top level relationship list includes only company, which in turn is allowed to have under it officer relationships, manager relationships, and so on.

In the following example, the links between nodes illustrate the relationships. Although not shown, the relationships carry effectivity dates, so the hierarchy may change over time. The Hierarchy Manager has several properties comprising: a Supplier denoting a String (interpreted as backbone object GID) pointing to the supplier of the relationship; a Receiver denoting a String (interpreted as backbone object GID) pointing to the receiver of the relationship; a StartDate denoting a Start date for relationship; a EndDate denoting an End date for relationship; a RelationshipType denoting an Integer specifying relationship type as defined by the Relationship Manager; and a RelationData denoting Relationship type-specific extra data for this instance.

Licensing and Appointments Object Models

Figure 6:
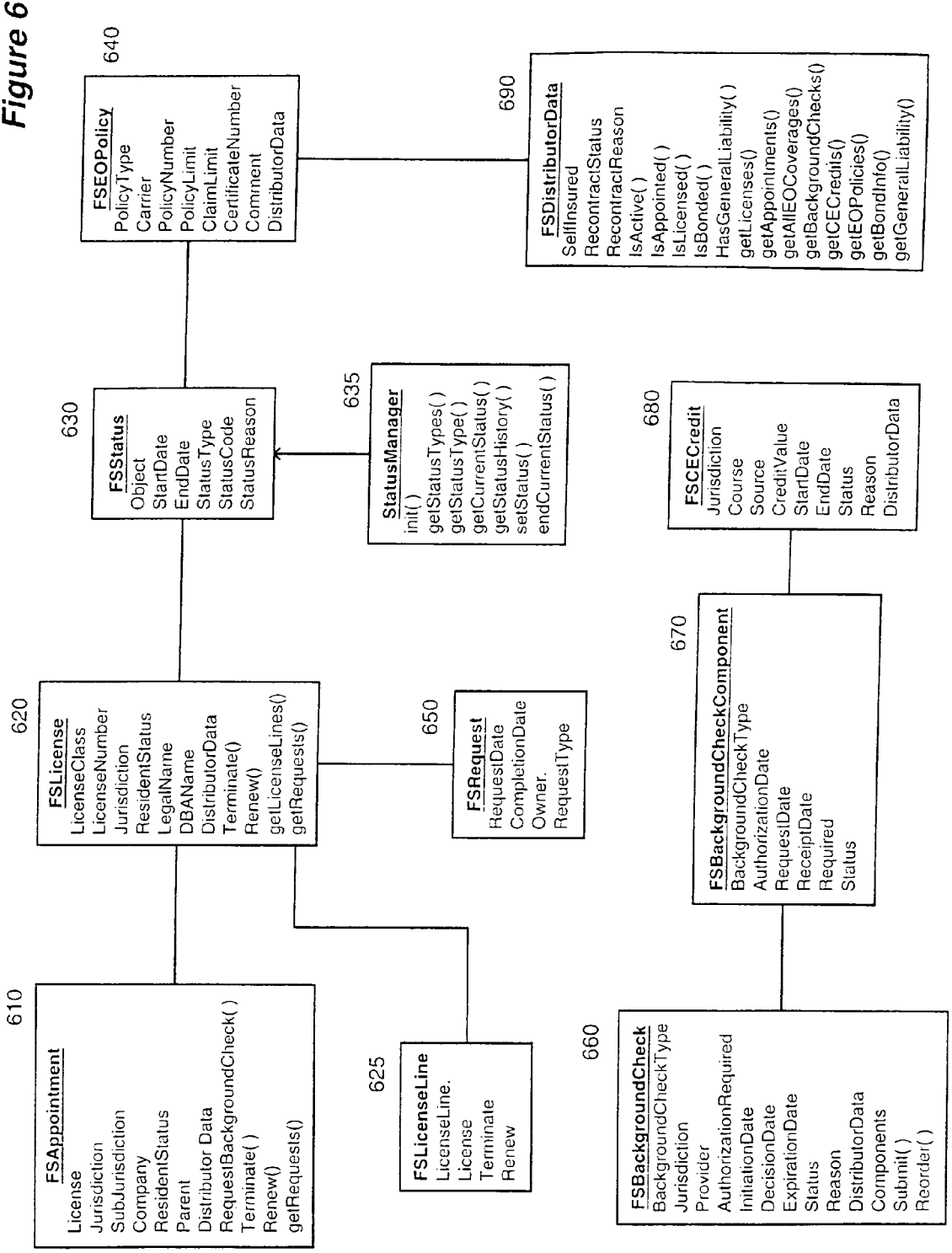
FIG. 6 is an illustration of the licensing and appointment object models in an embodiment of the invention.

FIG. 6 is an illustration of the licensing and appointment object models in an embodiment of the invention. The Licensing and Appointment module of the DMSS enables financial services institutions to manage the license and appointment credentials for distributors and to validate compliance with industry regulations. The licensing and appointment rules enforced by the system are applied to all distributors managed by the system, whether they are employees of the financial services institution or employed by an external distributor. The licensing and appointment object model comprises the FSAppointment class 610, FSLicense class 620, FSStatus class 630, FSEOPolicy class 640, FSLicenseLine class 625, FSRequest class 650, StatusManager class 635 which invokes methods of FSStatus 630, FSDistributorData class 690, FSBackgroundCheck class 660, FSBackgroundCheck-Component class 670, and FSECredit class 680.

When a financial services institution deploys the DMSS, it may make changes to the Licensing and Appointments module. Primarily, the institution may update the module using XML (Extensible Markup Language). Many of the changes made to this module will be changes to the rulesets for setting up licenses and appointments for distributors. For example, the following sample XML provides a model for a licensing and appointment rule.

```
<RULE_SET>
-   <PRECONDITION>
        <START_DATE day="1" month="1" year="1999" />
        <END_DATE day="30" month="6" year="1999" />
    </PRECONDITION>
-   <RULE>
-       <PRECONDITION>
            <JURISDICTION jurisdiction="CA" />
            <PRODUCT product="Variable Insurance" />
        </PRECONDITION>
-       <TEST>
-           <AND>
                <LICENSE_LINE_TEST jurisdiction="CA"
                license_line="Series 63" />
                <APPOINTMENT_TEST jurisdiction="CA"
                license_line="Variable" />
            </AND>
        </TEST>
    </RULE>
</RULE_SET>
```

The precondition and the test elements are required for a valid rule.

Request Object Model

In an embodiment of the invention, a Request class contains the details regarding a variety of requests. These can be requests for appointments, licenses, proof of documentation, letter of certification, and so on. The request types are defined in XML. The request object model possess several properties comprising RequestDate—a date on which the request is initiated; a CompletionDate denoting the date on which the request is completed; an Owner denoting the requester initiating the request; and a RequestType indicating the type of request. The values depend on the context.

License Object Model

In an embodiment of the invention, a License class represents a physical license issued to a distributor. The license class has several properties comprising a LicenseType denoting the type of license (for example, agent, broker, and so on), license types are defined in an XML file; a LicenseClass denoting the class of license, for example, individual, corporate, partnership, license classes are also defined in an XML format; a LicenseNumber denoting the license number, which can be any alphanumeric string; a Jurisdiction denoting the jurisdiction (state/province) associated with the license, Jurisdiction codes are defined in an XML format; a ResidentStatus indicating whether the party associated with the appointment is a resident of the jurisdiction for which it is valid; a LegalName denoting the legal name of the distributor as it appears on the license; a DBAName denoting the "Doing Business As" name as it appears on the license; a DistributorData denoting a backpointer to the FSDistributor Data; a Terminate( ) to mark the license as being terminated; a Renew( ) to renew the license for the specified period; a getLicenseLines( ) providing a helper function that returns a collection of FSRequests associated with this FSLicense; a getRequests( ) providing a helper function that returns a collection of FSRequests associated with this FSLicense.

License Line Object Model

In an embodiment of the invention, a LicenseLine class represents the line of insurance covered by particular license. License line class has several properties comprising a LicenseLine denoting the line of authority for the license; a License denoting the associated FSLicenseDocumentation; a Terminate to mark the license line as being terminated; and a Renew to renew the license line for the specified period.

Appointment Object Model

In an embodiment of the invention, an appointment class encapsulates all the data associated with an appointment. The appointment object model comprises a License denoting the License associated with this appointment; a Jurisdiction denoting the jurisdiction (state/province) associated with the appointment, the jurisdiction is determined by the licenses associated with the appointment, it is provided on the appointment for convenience, jurisdiction codes are defined in an XML format; a SubJurisdiction denoting the sub-jurisdiction (county) associated with the appointment—this field is only applicable for certain jurisdictions, sub-jurisdiction codes are defined in an XML format; a Company denoting the financial services company for which the appointment is being issued; a ResidentStatus indicating whether the party associated with the appointment is a resident of the jurisdiction for which it is valid; a Parent indicating the distributor firm from which the blanket appointment comes; a Distributor Data denoting a backpointer to the FSDistributorData; a RequestBackgroundCheck( ) to create a new FSBackground-Check with the minimum set of FSBackgroundChecks required for the appointment (these items are defined in an XML format); a Terminate( ) to mark the appointment as terminated; a Renew( ) to renew the appointment for the specified period; a getRequests( ) providing a helper function that returns a collection of FSRequests associated with this FSAppointment.

Policy Object Model

In an embodiment of the invention, a Policy object model contains information regarding any coverage the distributor has. The forms of coverage defined in the default implementation are errors and omissions, general liability, bond and self-insurance. The Policy object model has several properties comprising a PolicyType denoting the type of coverage such as errors and omissions or general liability; a Carrier denoting the carrier of the coverage; a PolicyNumber denoting the policy number. This can be any alphanumeric string; a PolicyLimit denoting the aggregate limit on the policy; a ClaimLimit denoting the dollar amount limit per claim; a CertificateNumber denoting the certificate number associated with this policy; a Comment used to record any notes for this coverage; a DistributorData denoting a backpointer to the associated FSDistributorData.

Background Check Object Model

In an embodiment of the invention, a Background Check object model contains several Background Check Components. Background checks are not always tied to appointments. They may be created on a stand-alone basis.

Customization XML files may contain information specifying components and types for background checks.

The Background Check object model has several components comprising a BackgroundCheckType denoting the "type" of background check—this is used to define packages i.e., groupings of components, it is used to define default selections defined in the XML; a Jurisdiction denoting the jurisdiction (state/province) where the background check should be performed; a Provider denoting the provider used to perform the background check; an AuthorizationRequired to indicate if authorization is required from the distributor before the background check can be initiated; an InitiationDate denoting the date when the background check was initiated; a DecisionDate denoting the date when the decision was made; an ExpirationDate denoting the date when the background check can no longer be considered current; a Status containing the overall decision status code that indicates either Approved or Rejected (Valid decision values may be defined in an XML format); a Reason to indicate the reason for a denial (if applicable; valid reason codes may be defined in an XML format); a DistributorData denoting a backpointer to the associated FSDistributorData components; a collection of the FSBackgroundCheckComponents associated with this background check; a Submit( ) to start the workflow process for conducting the background check; and a Reorder( ) to Reorder the background check. A duplicate may be created to maintain a history.

Background Check Component Object Model

In an embodiment of the invention, a Background Check Component object model contains a backgroundCheckType to indicate the type of background check to be performed. All valid background check types may be defined in XML format; an AuthorizationDate denoting the date that authorization was received to perform this check; a RequestDate denoting the date that the request was submitted to the vendor; a ReceiptDate denoting the date on which the results were received from the vendor; a Required to indicate if the component was a required item; a Status indicating the status for the individual background check component that indicates either Yes or No.

Credit Object Model

In an embodiment of the invention, a Credit object model may be used to record the distributor's education credits on the system. Education credit requirements for specific licenses may be defined in an XML format. The Credit object model has several properties comprising a Jurisdiction denoting the jurisdiction (state/province) associated with the education credit (Jurisdiction codes may be defined in an XML format); a Course denoting the course taken; a Source denoting the company through which the course was taken; a CreditValue denoting the credit value for the course; a StartDate denoting the start date of the effective period for the credit; an EndDate denoting the end date of the effective period for the credit; a Status denoting the status of the credit; a Reason denoting the reason associated with the status; a DistributorData denoting a backpointer to the associated FSDistributorData.

Distributor Data Object Model

In an embodiment of the invention, a distributor data object model defines all the data that is associated with a distributor and that is required to manage the Licensing and Appointments package. The distributor data object model has several properties such as a SelfInsured object to indicate if the distributor is self-insured; an IsActive( ) object to indicate if the distributor is active, that it, has appointments still in effect; an IsAppointed( ) object to indicate if the distributor is properly licensed and appointed to receive credit for a transaction (ensures that there is a valid appointment and associated license for the date of the transaction, the IsAppointed method evaluates whether a given party in a specific jurisdiction is legally capable of selling a specific product); a IsLicensed( ) to indicate if the distributor is properly licensed—ensures that there is a valid license for the date of the transaction, the IsLicensed method evaluates whether a given party in a specific jurisdiction is legally capable of selling a specific product; a IsBonded( ) to indicate if the distributor is bonded (i.e., has an EOPolicy of type Bond Info); a HasGeneralLiability( ) to indicate if the distributor has general liability insurance (i.e., has an EOPolicy of type General Liability Insurance); a getLicenses( ) to return a collection of all FSLicense objects associated with the distributor; a getAppointments( ) to return collection of all FSAppointment objects associated with the distributor; a getAllEOCoverages( ) to return a collection of all FSEOPolicy objects associated with the distributor; a getBackgroundChecks( ) denoting a collection of all FSBackgroundCheck objects associated with the distributor; a getCECredits( ) denoting a collection of FSContinuingEducationCredit objects associated with the distributor; a getEOPolicies( ) to return a collection of all FSEOPolicy objects of type Errors and Omissions Policy associated with the distributor; a getBondInfo( ) to return a collection of all FSEOPolicy objects of type Bond Info associated with the distributor; a getGeneralLiability( ) to return a collection of all FSEOPolicy objects of type General Liability Insurance associated with the distributor.

Selling Agreement Object Model

In an embodiment of the invention, the implementation of the DMSS relies on a set of agreements (a Selling Agreement object model), which are types of contracts. A selling agreement details the terms of compensation between a financial services company and a distributor that is selling its products. It is a contract that explains agreements established between financial services companies and their distributors. Typically, an agreement is with a distributor firm and includes a sales team hierarchy of the people that work for that firm.

The flexibility of DMSS agreements allows for a different commission model for each agreement.

Contract Kits Object Model

Figure 7:
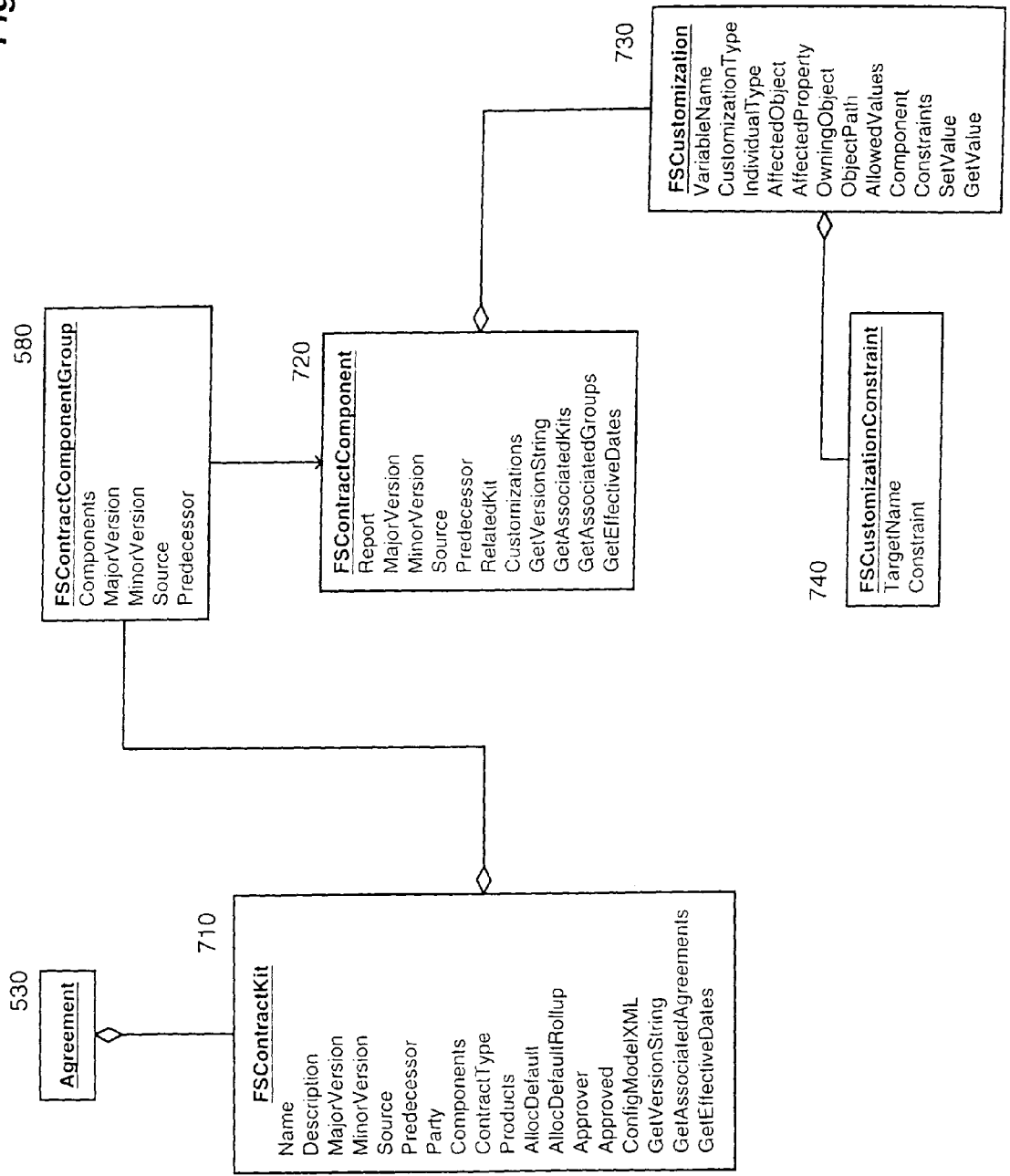
FIG. 7 is an illustration of contract kit object models in accordance with an embodiment of the present invention.

In an embodiment of the invention, Agreements may be constructed from contract kits. Each contract kit contains a set of contract kit groups. A contract kit group classifies sets of contract kit components. Once a contract kit is constructed, the system submits it for approval to designated parties. The approval process allows for considerable flexibility at deployment time. For example, a user may set up the system to automatically generate an email notification when an agreement is approved or denied. A user may perform this customization by writing Java code that causes DMSS workflow triggers to be issued initiating the notification. FIG. 7 is an illustration of contract kit object models in accordance with an embodiment of the present invention. The contract kit object model comprises FSContractKit class 710 which contains FSContractComponentGroup 580. FSContractComponentGroup 580 invokes methods in FSContractComponent class 720, which FSCustomization class 730, which further contains FSCustomizationConstraint class 740.

Compensation Components Object Model

In an embodiment of the invention, a compensation component object model is a specialization of the contract kit component object. Compensation Component deals specifically with distributor compensation. This object contains a reference to a template commission model that includes quota, eligibility ruleset, plan, bonus, and bonus rule objects. When a user creates an agreement, a selection is made in the user interface to include some (or all) of the compensation components for a contract kit. Once selected, the template models of the compensation components are collected into a commission model referenced by the agreement (an FSAgreement object). The sales team hierarchy for the agreement model is constructed from views of the FSParty objects (see FSParty). Organizational hierarchies, such as sales teams hierarchies, are typically based on reporting structures within companies, but they might reflect an independent reporting hierarchy. Participation in plans is selected for each compensation component in an agreement. Agreements may be customized on an individual (FSParty) basis.

Independent Agreements Object Model

The DMSS comprises compensation models that provide the ability for any distributor to participate in simultaneous contracts with one or more financial service companies. In an embodiment of the invention, contracts between parties are represented within DMSS as agreement objects. This flexible approach allows the same party (individual or organization) to be associated with many different agreements. In each agreement, the party is uniquely identified, remaining independent of any other agreements with which the party is associated. For example, in one agreement a distributor named Bud may be compensated for selling traditional life policies. In a second agreement, Bud may be compensated for selling a variable life product. Bud's compensation from one agreement may be independent of his compensation from the other agreement. This independence may be maintained in the system by agreement relationship objects. In the previous example, Bud has two different agreement relationships. The system also maintains personal information about Bud (like his address) that is separate from his agreement relationships.

Shared Compensation Object Model

In an embodiment of the invention, the way credit is given in one distributor agreement may be independent of how it is given in another agreement. For example, suppose Pete also gets credit (through roll-up) when Bud sells a variable life policy in his first agreement. Suppose, too, that Stu gets credit when Bud sells a traditional life product through his second agreement. Because agreement relationships are independent of one another, Stu will not get any credit when Bud sells a variable life policy through his first agreement.

Interdependent Agreements

In an embodiment of the invention, one agreement may depend on another one. Business submitted for one agreement also may be accounted for in a second agreement. For example, suppose an account-manager agreement type allows a financial services account manager to be compensated on all the business submitted by his distributor firms (accounts). Each of these firms has a unique agreement with the financial services company and yet the account manager compensation includes all the business done with the firms tied to his account manager agreements.

Agreement Object Model

In an embodiment of the invention, an agreement object model represents a specific instance of a contract between two parties. It may be created from a contract kit depending on the type of agreement.

Agreement Relationship Object Model

In an embodiment of the invention, whenever a party is added into an agreement hierarchy, the system creates an agreement relationship object. A relation object is created with a supplier and receiver property that defines a mapping between an agreement object and a party object. The relation property for relation data refers to an instance of Agreement Relationship. The agreement Relationship is the place where agreement-specific data is stored for a party. This includes specific payment definitions and individual agreement customizations for the distributor. It also includes the associated party's contact point to be used for this agreement.

Agreement Participant Object

In an embodiment of the invention, the agreement Participant class is a subclass of the stock Person class. Instances of an agreement participant are created while adding parties to an agreement's sales team hierarchy. Information, such as contact points, payment methods, and licensing and appointment for the producer, is stored on the Party object. Party object is indirectly tied to its agreement Participants through Agreement relationships. (There can be more than one agreement participant object for each party object.) The normal SCPerson fields, such as Address, are not filled in on Agreement Participant instances, with the exception of Name (which matches the party's name).

Pooling Agreement Object Model

In an embodiment of the invention, a pooling agreement is a special kind of agreement that combines quotas and compensation. It could be set up to combine compensation for two or more parties. Or it could combine compensation from two different agreements set up for one party. The pooling agreement comprises at least the following components:

Agreements—A back-pointer to the FSAgreement objects that are being pooled together.

Participants—A collection of FSPoolingAgreementParticipants

Relations—A collection of FSPoolingRelations

Quotas—A collection of quotas that are pooled in this pooling agreement.

The Agreement object also stores the components that are pooled in the pooling agreement (the pooled quotas belong to these components). There is also a Relation for each party in the pooling agreement (just as in an ordinary selling agreement).

Pooling Relation Object Model

In an embodiment of the invention, the members of a pooling agreement are agreement relations (since work may be pooled from parties in a particular agreement). The Pooling Relation object represents these members.

Pooling Participant Object Model

In an embodiment of the invention, a Pooling Participant object model specifies a member and a quota to be pooled. For each member and each quota, there is a participant specified on a Pooling Agreement object.

There are start and end dates for each participant. The Pooling Participant object model has several properties comprising a Participant denoting the Agreement Participant object from the agreement being pooled; a Quota denoting the Quota object from the selling agreement's model (this quota is based on the template quota and the agreement relationship); a Source, a boolean specifying if this member is a source in the pooling agreement (each member must be at least a target or a source); a SourceStartDate denoting a date specifying when the participant starts being a source for pooling; a SourceEndDate denoting a date specifying when the participant ends being a source for pooling; a target, a boolean specifying if this member is a target in the pooling agreement (each member must be at least a target or a source); a TargetStartDate denoting a date specifying when the participant starts being a target for pooling; a TargetEndDate denoting a date specifying when the participant ends being a target for pooling.

Engine Transaction Processing

In an embodiment of the invention, when the DMSS engine processes input, the input transaction must identify a specific agreement relationship (AR) object. That relationship identifies at least one Agreement object that the transaction applies to; however, there may be other agreements for which the input transaction should also apply. These other, related agreements are determined by links (references) to the agreement relationship specified for the input transaction.

The system identifies and manages such links in two phases, a preprocess and a process phase.

Debt Management Object Model

In an embodiment of the invention, the DMSS Debt Management System enables users to administer and maintain the issuance, transference, and recovery of debt (for example, advances, draws, or loans). In addition to encapsulating these debt rules, the Debt Management System also provides an automated process for advancing funds according to the debt rules defined in the system.

Rule evaluation in the Debt Management System consists of two steps. First, the system evaluates the Formula object associated with a given rule (the rule's property on an Debt Management Rule instance), which yields a result (e.g., numerical value). Then, this result is passed to a call to an external event—CheckExternalRules( )—for additional (optional) processing. A handler for this event may, for example, check regulatory rules, licenses, and appointments before returning a value to the system. If a rule is specified as automatic, an advance is automatically created for the amount returned by the call to CheckExternalRules( ). Otherwise, this value is used as a reference signifying the maximum amount for which a manual advance may be issued.

Debt Management Rule Object Model

In an embodiment of the invention, a Debt Management Rule object model defines the set of rules required to determine if a party is eligible for an advance, whether to allow a debt transfer, and whether to raise an attention condition. The Debt Management Rule object model possesses several properties comprising:

a RuleClass denoting an enumerated property identifying the type of debt rule this object represents;

a Rules property encapsulating the set of rules that determine whether or not the associated action (advance issuance, debt transfer, condition generation) should occur;

a RuleType denoting a string describing the type of action this rule affects (such as Advance, Draw, Transfer, Collection, and WriteOff);

a Reason denoting a descriptive string specifying why this rule dispatches a particular action;

an Automatic property, a flag (e.g., Boolean) specifying whether or not the system should automatically execute the associated action (such as advance funds, transfer debt, raise condition);

a ToAccount denoting the Account that is credited with the resultant advance (ADVANCE-type rules), is the source for a debt-transfer (TRANSFER-type rules), or generates a condition (CONDITION-type rules);

a FromAccount denoting the FSAccount which is charged for an advance (ADVANCE-type rules) or is the source for a debt-transfer (TRANSFER-type rules); a StartDate denoting a rule effectivity date; an EndDate denoting a rule expiration date;

a DefaultRepaymentSchedule denoting the default repayment criteria;

a DefaultRepaymentAdjustment denoting a non persistent property which points to the adjustment on the DefaultRepaymentSchedule;

a PartyFormula denoting a Formula which defines which parties in the system should use this rule;

an Overrides containing a list of those Debt Management Rule objects this instance overrides. This property is used to override debt management rules at the agreement relationship level. None of the agreement-level rules listed in this property is evaluated (the default is to evaluate all applicable rules at all levels);

a CheckExternalRules( ) to be called after the Rules property has been evaluated. It should be used to check external rules that have an impact on the action (such as regulatory rules, licenses and appointments). If implemented, this method must return the modified advance/transfer amount (for example, if the advance should be completely disallowed, this method must return 0.0);

an OnAdvance( ) denoting an event trigger that is called for ADVANCE-type rules when the evaluation of the Rules formula and the call to the CheckExternalRules( ) method have non-zero return values. The advance processing continues by generating an Advance only if this event returns true. Deployments may override the default (null) implementation in order to provide custom advance processing;

an OnTransfer( ) denoting an event trigger to be called for TRANSFER-type rules when the evaluation of the Rules formula and the call to the CheckExternalRules( ) method have non-zero return values. The transfer processing continues by updating the associated account balances and generating a pair of FSAccountUpdateDetail objects only if this event returns true. Deployments may override the default (null) implementation in order to provide custom transfer processing;

an OnCondition( ) denoting an event to be called for CONDITION-type rules when the evaluation of the Rules formula and the call to the CheckExternalRules( ) method return non-zero values. The default implementation of this method creates a Debt Exception to record the raised condition.

Debt Object Model

In an embodiment of the invention, a Debt object persists a single debt issuance as determined by a Debt Management Rule object. The Debt object has the following properties:

a Rule denoting a reference to the Debt Management Rule that created this advance. In a manually initiated advance, this property is null;

a DebtType denoting a the type of advance (such as draw, advance, or loan);

a Reason denoting the reason for this advance;

a ToAccount denoting the system account that should be credited with this advance;

a Component denoting the component associated with this advance;

a Holding denoting the policy associated with this advance;

a Product denoting the product associated with this advance;

an AgreementRelationship denoting the agreement relationship associated with this advance. The party and agreement associated with the advance can be accessed via this property;

a RepaymentSchedule denoting a property containing the list of Payment Rule object defining the repayment schedule for this debt. These rulesets will often contain variables representing the policy, product, and agreement associated with the advance.

Formula Properties in Payment and Debt Management Objects

In an embodiment of the invention, in the Debt Management and Payment systems, Formula objects are used to model a variety of rules across several distinct classes. Formula properties objects include Payment Rule defining a policy for executing a set of account adjustments. These rules are also used to define debt repayment schedules; that is, the formula is set up to model a schedule that credits money to an account with a debt balance. The rule should return true to enable adjustment processing. Return values of false prevent processing of the associated adjustments.

Payment Object Model

In an embodiment of the invention, the DMSS Payment system is responsible for taking earned compensation, processing it through a set of adjustment rules, and generating net payments for the parties in the system. These payments can then be split across several different accounts as defined by the Financial Information instances for each party. The Payment system runs in two steps. In the first step, compensation is evaluated according to a set of adjustment rules (Payment Rule) that are associated with a given party (through the party's Payment Profile object). For each rule that evaluates to true, adjustments (Adjustment) may be made which modify the balance of accounts (Account). Every time an account balance is changed, an audit object (AccountUpdateDetail) may be created to record the amount, date, and reason for the adjustment.

The second step consists of actually initiating payments from a party's account balance.

The payments are identified in the first step, when the adjustments are made to a party's account balance. Each party can define a set of payment methods (PaymentMethod) dictating how payable sums are disbursed. The manner in which a payment is split across multiple payment methods is encapsulated within financial information (Financial Information) objects.

At several points during payment processing, the payment engine calls external triggers that can be implemented to provide custom functionality. The following is a list of these triggers:

FSPaymentRule.OnAdjustment( ), which fires when a set of adjustments (FSAdjustmentGroup) is created.

FSAdjustment.OnAccountUpdate( ), which fires when an account is updated.

FSPaymentMethod.InitiatePayment( ), which fires when a specific payment method is executed.

Payment Profile

A Payment Profile class links a Party in the system with the set of rules that dictate how payments should be processed for the party.

Ruleset Objects

Ruleset is a collection of Payment Rule objects that defines what adjustments need to be made to the incoming payment request.

Payment Rule Object Model

The Payment Rule class maps a set of rules (described by a Formula) to payment adjustments that need to fire when a given rule evaluates to true. The Payment Rule class has the following properties:

a Rule describing the condition in which the associated adjustment should fire. For example, if an adjustment should fire only when the agreement name equals My Special Agreement and the date is after Apr. 15, 2000, the formula may be expressed as follows: (Agreement.Name='My Special Agreement') && (Date>Apr. 15, 2000)

a RuleType denoting an enumerated property identifying what type of payment ruleset this is. Valid values for this property are PAYMENT (signifying a ruleset used to generate payments) and REPAYSCHEDULE (marking the ruleset as a repayment schedule);

an Adjustments denoting a collection containing the Adjustment instances which define the adjustments that should take place if the Rules property evaluates to true.

a Priority denoting a relative priority of this payment ruleset in relation to other, possibly contending rulesets. Higher priority (e.g., 1 may be highest) rulesets are evaluated before lower priority rulesets during payment calculation.

a OnAdjustment( ) denoting an event trigger to be called each time an adjustment fires. If this event returns false, the adjustment does not execute. A user can override this method for custom adjustment processing.

Adjustment Object Model

In an embodiment of the invention, an Adjustment object model contains information related to crediting or debiting a single account, although it does not record an actual adjustment event. When an account is adjusted, an Account Update Detail object may be created to record a history of this account transaction. The Adjustment object model has several properties comprising:

a Name denoting a descriptive name for this adjustment type;

an UpdateAccount denoting a reference to the Account object that is updated when this adjustment is activated;

a Formula denoting a Formula object defining the calculation used to determine how much money should move with this adjustment;

an OnAccountUpdate( ) denoting an event trigger to be called each time an account is updated. Funds are moved only if this event completes successfully (returns true). This method may be overriden for custom account processing.

Account Object Model

An account object model is an in-system repository for various fund amounts. One party may have multiple accounts. For example, a particular party may have an Advance account and an Earned Compensation account whose balances reflect the amount advanced to and earned by the party. Alternatively, a party may have many system accounts that map to individual policies, components, and agreements. The account object model possesses several properties comprising:

a Name denoting a descriptive name for this account;

a Balance denoting the balance of this account. If this account maintains the status of advanced or drawn funds, the balance may be negative;

an Agreement denoting the agreement with which this account is associated;

a Component denoting the Compensation Component with which this account is associated;

a Party denoting the party with which this account is associated;

a Policy denoting the Policy with which this account is associated; and a Product denoting the Product with which this account is associated.

Account Update Detail Object Model

In an embodiment of the invention, an Account Update Details object contains adjustment information for FSAccount objects. Whenever the system modifies the balance of an FSAccount, it creates an Account Update Detail object. The Account Update Detail object possesses several properties comprising:

an Account denoting a reference to the modified account;
an Amount denoting the amount by which the balance of the associated account was adjusted;
an UpdateDate denoting the date this update occurred;
an Adjustment denoting the adjustment that created this update.

Financial Information Object Model

In an embodiment of the invention, a Financial Information class (FSFinancialInfo) maps an individual payment method to a condition that triggers the execution of that payment method. AgreementRelationship and FSParty classes maintain collections of Financial Information objects. The Financial Information class has several properties comprising:

a SplitFormula denoting a formula that determines when and how much money should be paid using the associated payment method;
a PaymentMethod denoting a reference to the Payment Method that should be used to compensate the owner of this Financial Information object according to the rules defined in the associated SplitFormula;
a Priority denoting the relative priority of this FSFinancialInfo object in relation to other, possibly contending instances. Higher priority (1 is highest) objects are processed before lower priority objects during payment calculation.

Payment Method Object Model

In an embodiment of the invention, Payment Method object model is the base class for defining various methods of payment. It defines an interface, InitiatePayment( ) for initiating the disbursement of funds. The Payment Method object model has several properties comprising:

a Balance denoting the undisbursed money for this payment method;
a PayFrequency denoting an enumerated property identifying how often payment should occur from this payment method;
a PayWindow denoting the length in days around a specified pay date in which a payment can occur;
a LastPayDate denting the last date a payment was initiated from this payment method;
a MinPayThreshhold denoting the minimum balance required for this payment method to issue a payment;
a MaxPayThreshhold denoting the maximum amount that can be disbursed at one time from this payment method. If this value is reached, the system creates a Payment Exception;
a InitiatePaymento, a method to be called when the payment method executes. If this method fails (returns false), the system creates a Payment Exception to record this situation and the payment accrues in the Balance property.

Payment Detail Object Model

In an embodiment of the invention, a payment Detail object model records the issuance of a single payment. The system creates a Payment Detail object whenever an FSPaymentMethod executes successfully. The Payment Detail object has several properties comprising:

an Account denoting the account from which the payment originated;
an Amount denoting the amount of this payment;
a PaymentDate denoting the date of this payment;
a PayMethod denoting a reference to the FSPaymentMethod that generated this payment.

Payment Exception Object Model

In an embodiment of the invention, a Payment Exception object model records an exception that occurs during the payment cycle. As discussed previously, there may be situations in which the system creates exceptions.

Customization Tools

In an embodiment of the invention, the DMSS uses data objects stored in formatted files such as the Extended Markup Language (XML) format to customize the DMSS. For example, customization may be achieved by modifying the XML files. At run time, the DMSS software parses the XML and loads the files.

The DMSS software uses several XML files, identified below. In the first group, there is only one of each of the files listed. The second group identifies a kind of XML file of which there can be more than one.

The system includes one of each of the following files:
enums.xml containing the enumerated lists that appear in the DMSS;
relationships.xml defines relationship types—the information in this file specifies how each relationship type implements the interfaces IrelationshipQuery and IrelationshipFactory;
hierarchy.xml defines hierarchy types;
There can be many of the following types of files, each one with a different name.
rules.xml defines rulesets.

A Compensation Example

The following example illustrates how the object models described in the present invention combine to carry out the computing of distributors compensation in an embodiment of the invention. In this example, there are five agreements (A1, A2, A3, A4 and A5) and five distributors (Tex, Don, Ed, Moe and Amy). Each distributor may be involved in none or a combination of any of the five agreements. The compensations received from a sale depend on the type of the agreement. The table below shows the compensation distribution according corresponding agreements:

| Case | Tex gets | Based on | Don gets | Based on | Ed gets | Based on | Moe gets | Based on | Amy gets | Based on |
|---|---|---|---|---|---|---|---|---|---|---|
| 1 | 0 | A4 | 80% | A4 | 0% | N/A | 6% | A1 | 1% | A5 |
| 2 | 0 | A4 | 80% | A4 | 15% | A2 | 1% | A1 | 1% | A5 |
| 3 | 50% | A3 | 0% | N/A | 45% | A3 | 5% | A1 | 1% | A5 |

The DMSS distributes the compensation for Cases 1, 2, and 3 through five different agreement objects and five different contract kits. Each of the contract kits defines compensation components specifying the performance measures and plan elements of the agreements. The compensation components indicate, for example, that Tex gets 50% on a traditional policy, like the one sold in the third transaction. The agreement objects are created from the contract kits. Each of the distributors in this example has an associated party object 540 (FSParty). Party objects are used to maintain all of the information about a distributor that is independent of agreements.

Party objects are associated with an agreement by adding them to an agreement allocation hierarchy. For every party added to an agreement in this way, the system creates an object called an Agreement Relationship object 520 (FSAgreementRelationship). The agreement relationship object maps the party to an agreement and a sales team member 560 (FSAgreementParticipant) that is a derivative of a Person object 550 (SCPerson).

When the system creates an agreement relationship, it assigns a unique ID called the Agreement Relationship ID (the Unid property of the FSAgreementRelationship). The Agreement Relationship ID uniquely identifies the distributor and a specific agreement.

The following explanation covers the way in which the DMSS processes the three transactions described above.

Figure 8:
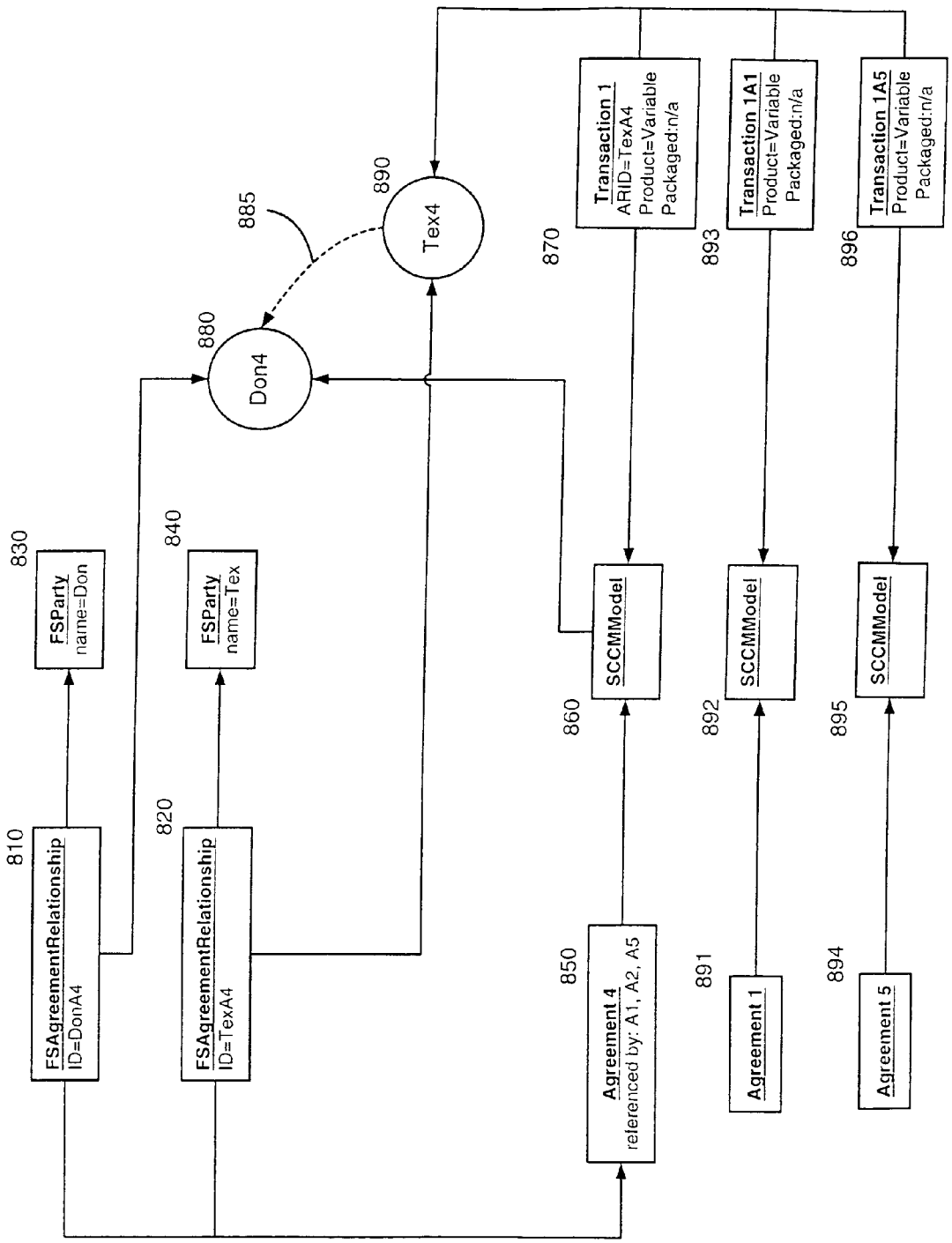
FIG. 8 is an illustration of a block diagram representing exemplary transaction processing.

FIG. 8 shows a block diagram representing transaction processing in the current example. When an agreement object is constructed, it includes a reference to a commission model object 860 (SCCMModel). For the agreements described above, there are five commission model objects. Each commission model object for an agreement refers to a specific sales team hierarchy 880 and 890. The relation 885 illustrates an example of a hierarchy. The DMSS assumes there is a custom transaction loader program that has been built to create transaction object 870 (FSTransaction) for use as input to the commission engine. The transaction objects indicate who sold what to whom and identify the appropriate agreements. The Agreement Relationship ID is a customizable string value assigned to every agreement relationship. In this example, the Agreement Relationship ID is made to be readable and unique.

In the current example, to process the input transactions, the DMSS provides a commission engine preprocessor 125. The DMS engine evaluates all input transactions (in batches until all available have been processed) and for each associates an agreement object and sales team member. It also identifies any other agreement objects affected by the input transaction. When it finds an affected agreement object, it creates additional transactions that process compensation according to the newly identified agreement commission models. Once all input transactions have been associated with agreements, the DMS engine invokes the commission engine in the usual way (accumulate, compensate) on all agreement models. The ID of the transaction in 870 is used to identify the Agreement Relationship 810 related to the party or parties submitting the business 830 and 840 (e.g. Don and Tex). The agreement relationship object 810 provides access to the agreement 850 (e.g. A4), the commission model 860 (SCCModel) referenced by the agreement, the sales team member object and the Party objects 830 and 840. Based on the input ID information, the system modifies the transaction model and sales team properties. As a result of references to agreement 4 relationships, the transaction processing affects three other agreements in this example. The referencing agreement relationships for Agreements 1, 2, and 5 may be referred to as: TexA1, DonA2 and TexA5.

In processing transactions, if the system encounters an agreement-to-agreement reference (a link), it is a signal that the input SCCMTransaction for the agreement commission model is to be duplicated and associated with the other related agreement commission models 892 and 895. As discussed in associations with Agreement 2, not all transactions credited to Don in Agreement 4 should also be credited to Ed in Agreement 2. Only those transactions for which Ed has been identified as the packager should be credited to Ed. A rule needs to be defined to ensure that only the appropriate transactions are credited to Ed. This is referred to as a Transaction Rule. Therefore, a transaction rule is created to ensure that Ed gets credit on only those Agreement 4 transactions that he helped with. With such a rule in place, the transaction rules result in new transactions. When the second sample transaction is processed in the same way, the resulting set of transactions would differ because the packager has been identified as Ed. An additional transaction for the Agreement 2 model would be created. Transaction rules such as the one described above are defined in the DMSS contract kit maintenance tool and are stored in the TransRules property of a contract kit object. They are available to be selected for a party.

Thus, a framework for processing sales transaction data is described in conjunction with one or more specific embodiments. The invention is defined by the claims and their full scope of equivalents.

What is claimed is:

1. A system for managing relationships between a product provider and distributors of said product comprising:
   at least one processor;
   memory coupled to said at least one processor; and
   said memory including code stored therein and executable by said at least one processor for management of relationships between a product provider and a plurality of distributors;
   said code comprising first code to create, for each distributor of a plurality of distributors, a customized contract between the distributor and a product provider, wherein the first code is configured to be executable by the processor and assembles at least a portion of the customized contract from contract components in accordance with a set of pre-stored, predetermined rules that govern relationships between contract components and the relationships define how to combine a plurality of the contract components into the customized contract between each of the distributors and the product provider, and the contract components include a compensation component that includes information for compensating the distributor;
   said code comprising second code to manage said plurality of distributors of said product provider;
   said code comprising third code to manage sales of products of said product provider by said distributors; and
   said code comprising fourth code to manage compensation of said distributors based on said sales of said products.

2. The system of claim 1 wherein said product of said product provider is an insurance policy.

3. The system of claim 1, wherein said code further comprises fifth code to manage debts of said plurality of distributors.

4. The system of claim 1, wherein said code further comprises fifth code to manage payment of said plurality of distributors.

5. The system of claim 1 wherein to manage said plurality of distributors comprises managing information necessary to maintain contact with said plurality of distributors.

6. The system of claim 1 wherein said plurality of distributors are arranged in a sales team hierarchy, and each distributor in said sales team hierarchy may receive compensation for sales by other members of said sales team hierarchy.

7. The system of claim 1, wherein said code further comprises fifth code to record transactional activities relating to compensation and debt of said plurality of distributors.

8. A method for using a computer system to process data and code to manage relationships between a product provider and distributors of said product comprising:

creating, for each distributor of a plurality of distributors, a customized contract between the distributor and a product provider using electronically accessible data and code governing management of at least portions of the data and code, wherein the code is configured to be executable by a processor and assembles at least a portion of the customized contract from contract components in accordance with a set of pre-stored, predetermined rules that govern relationships between contract components and the relationships define how to combine a plurality of the contract components into the customized contract between each of the distributors and the product provider, and the contract components include a compensation component that includes information for compensating the distributor;

processing at least a portion of the data and code to manage said first plurality of distributors of said product provider in accordance with first programmed rules;

processing at least a portion of the data and code to manage sales of products of said product provider by said first distributors; and processing at least a portion of the data and code to manage compensation of said first distributors based on said sales of said products in accordance with second programmed rules.

9. The method of claim 8 wherein said product of said product provider is an insurance policy.

10. The method of claim 8, further comprising processing at least a portion of the data and code to manage debts of said plurality of distributors.

11. The method of claim 8, further comprising processing at least a portion of the data and code to manage payment of said first plurality of distributors.

12. The method of claim 8 wherein processing said data and code to manage said first plurality of distributors comprises managing information necessary to maintain contact with said plurality of distributors.

13. The method of claim 8 wherein said plurality of distributors are arranged in a sales team hierarchy, and each distributor in said sales team hierarchy may receive compensation for sales by other members of said sales team hierarchy.

14. The method of claim 8, further comprising recording transactional activities relating to compensation and debt of said plurality of distributors.

15. A computer program product:

a computer usable medium comprising computer readable code for managing relationships between a product provider and distributors of said product, said computer readable program code configured to:

create, for each distributor of a plurality of distributors, a customized contract between the distributor and a product provider;

manage said plurality of distributors of said product provider, wherein the code to create the customized contract is configured to be executable by a processor and assembles at least a portion of the customized contract from contract components in accordance with a set of pre-stored, predetermined rules that govern relationships between contract components and the relationships define how to combine a plurality of the contract components into the customized contract between each of the distributors and the product provider, and the contract components include a compensation component that includes information for compensating the distributor;

manage sales of products of said product provider by said distributors; and manage compensation of said distributors based on said sales of said products.

16. The computer program product of claim 15 wherein said product of said product provider is an insurance policy.

17. The computer program product of claim 15 further comprising code to manage debts of said plurality of distributors.

18. The computer program product of claim 15 further comprising code to payment of said plurality of distributors.

19. The computer program product of claim 15 wherein said code to manage the plurality of distributors comprises code to manage information necessary to maintain contact with said plurality of distributors.

20. The computer program product of claim 15 wherein said plurality of distributors are arranged in a sales team hierarchy, and each distributor in said sales team hierarchy may receive compensation for sales by other members of said sales team hierarchy.

21. The computer program product of claim 15, further comprising a plurality of objects for recording transactional activities relating to compensation and debt of said plurality of distributors.

22. The system of claim 1 wherein said plurality of object modules further comprises means for validating and tracking regulatory licensing data associated with at least a subset of said plurality of distributors.

23. The system of claim 1 wherein said plurality of object modules further comprises means for operatively linking agreements between a second plurality of distributors and a second product provider and at least one of the agreements between the plurality of distributors and the product provider.

24. The method of claim 8 further comprising:

representing second agreements between a second plurality of distributors and a second product provider using electronically accessible data and code governing management of at least portions of the data and code; and operatively linking at least one of said first agreements to at least one of said second agreements to allow distribution credits to be allocated among the first and second plurality of distributors for transactions related to either of the first and second agreements.

25. The method of claim 8 wherein the data includes regulatory licensing data associated with at least a portion of said first plurality of distributors, the method further comprising:

processing at least a portion of the data and code to validate and track the regulatory licensing data.

26. The computer program product of claim 15 wherein the code is further configured to operatively link agreements between a second plurality of distributors and a second product provider and at least one of the agreements between the plurality of distributors and the product provider.

27. The computer program product of claim 15 wherein the computer readable program code is further configured to validate and track regulatory licensing data associated with at least a subset of said plurality of distributors.

28. The computer program product of claim 15 wherein the computer readable program code is implemented using object modules.

29. The system of claim 1 wherein the first code is further configured to be executable by the processor and assemble the customized contract in accordance with the set of pre-stored, predetermined rules that govern relationships between contract components.

30. The method of claim 8 wherein the code is further configured to be executable by the processor and assemble the customized contract in accordance with the set of pre-stored, predetermined rules that govern relationships between contract components.

31. The computer program product of claim 15 wherein the code is further configured to be executable by the processor and assemble the customized contract in accordance with the set of pre-stored, predetermined rules that govern relationships between contract components.

* * * * *